United States Patent
Kjellqvist et al.

(10) Patent No.: US 6,187,424 B1
(45) Date of Patent: Feb. 13, 2001

(54) SHEET MATERIALS SUITABLE FOR USE AS A FLOOR, WALL OR CEILING COVERING MATERIAL, AND PROCESSES AND INTERMEDIATES FOR MAKING THE SAME

(75) Inventors: Jerker B. I. Kjellqvist, Grueningeu; Ronald Wevers, Langnau, both of (CH); Johan A. Thoen, Terneuzen (NL); Wolfgang Quack, Mettmann (DE)

(73) Assignee: The Dow Chemical Company, Midland, MI (US)

( * ) Notice: Under 35 U.S.C. 154(b), the term of this patent shall be extended for 0 days.

(21) Appl. No.: 09/129,580

(22) Filed: Aug. 5, 1998

Related U.S. Application Data

(60) Provisional application No. 60/055,263, filed on Aug. 8, 1997, and provisional application No. 60/057,278, filed on Aug. 29, 1997.

(51) Int. Cl.$^7$ ................ B32B 7/02; B32B 5/16; B32B 3/26; B32B 27/08; C08L 23/00

(52) U.S. Cl. ............ 428/220; 428/323; 428/332; 428/304.4; 428/500; 428/515; 428/904.4; 525/240

(58) Field of Search .............. 428/323, 304.4, 428/500, 515, 904.4, 220, 332; 524/427, 570, 579, 584, 586; 525/240

(56) References Cited

U.S. PATENT DOCUMENTS

| | | | |
|---|---|---|---|
| 3,504,068 | 3/1970 | Zizlsperger et al. | 264/41 |
| 3,645,992 | 2/1972 | Elston | 260/80.78 |
| 3,914,342 | 10/1975 | Mitchell | 260/897 |
| 3,953,558 | 4/1976 | Hatano et al. | 264/22 |
| 4,076,698 | 2/1978 | Anderson et al. | 526/348.6 |
| 4,191,798 | 3/1980 | Schumacher et al. | 428/95 |
| 4,379,859 | 4/1983 | Hirosawa et al. | 521/59 |
| 4,464,484 | 8/1984 | Yoshimura et al. | 521/58 |
| 4,544,762 | 10/1985 | Kaminsky et al. | 556/179 |
| 4,612,300 | 9/1986 | Coleman, III | 502/113 |
| 4,798,081 | 1/1989 | Hazlitt et al. | 73/53 |

(List continued on next page.)

FOREIGN PATENT DOCUMENTS

| | | | |
|---|---|---|---|
| 2173775 | 4/1996 | (CA) | C08L/23/08 |
| 0 416 815 A2 | 8/1990 | (EP) | C08F/10/00 |
| 0 492 656 A1 | 7/1992 | (EP) | C08L/23/04 |
| 0 514 828 A1 | 11/1992 | (EP) | C07F/7/28 |
| 0 597 502 A2 | 5/1994 | (EP) | C08L/23/04 |
| 0 614 938 A1 | 9/1994 | (EP) | C08L/23/04 |
| 0 721 967 A1 | 7/1996 | (EP) | C08J/5/18 |
| 2145961 | 4/1985 | (GB) | B29C/47/90 |
| 93/03093 | 2/1993 | (WO) | C08L/23/04 |
| 93/08221 | 4/1993 | (WO) | C08F/10/00 |
| 93/13143 | 7/1993 | (WO) | C08F/10/02 |

OTHER PUBLICATIONS deGroot, A. Willem and Chum, P. Steve, Structure and Properties of Homogeneous Ethylene Alpha–Olefin Copolymers Produced by the Insite Technology, Oct. 4, 1994 Confenrence of the Federation of Analytical Chemistry and Spectroscopy Society (FACSS) in St. Louis, MO.
PCT International Search Report of PCT/US98/16277.
Williams, T., et al., *Polymer Letters*, vol. 6, pp. 621–624 (1968).
Cady, L.D., *The Role of Comonomer Type and Distribution in LLDPE Product Performance*, SPE Regional Technical Conference, Quaker Square Hilton, Akron, Ohio, pp. 107–119 (1985).
Dealy, John, *Rheometers for Molten Plastics*, pp. 97–99 (1982).
Ramamurthy, A. V., *Journal of Rheology*, 30(2), pp. 337–357 (1986).
Randall, James C., *Rev. Macromol. Chem. Phys.*, C29(2 & 3), 201–317 (1989).
Shida, M., et al., *Polymer Engineering and Science*, vol. 117, No. 11, pp. 769–774 (Nov., 1977).
Wild, L., et al., *Journal of Polymer Science: Polymer Physics Edition*, vol. 20, pp. 441–455 (1982).
Zimm, Bruno H., et al., *The Journal of Chemical Physics*, vol. 17, No. 12, pp. 1301–1314 (1949).
Rudin, Alfred, *Modern Methods of Polymer Characterization*, Chapter 3, pp. 103–112 (1991).
Park, Chung Poo, *Polyolefin Foam, Handbook of Polymer Foams and Technology*, Chapter 9, Hanser Publishers, New York (1991).

\* cited by examiner

*Primary Examiner*—Paul Thibodeau
*Assistant Examiner*—Sheeba Ahmed

(57) ABSTRACT

Sheet materials suitable for use as a floor, wall or ceiling covering material are described which comprise (1) a polymer mixture having (A) at least one homogeneously branched ethylene Polymer (A) having a molecular weight distribution, $M_w/M_n$, less than 3 and a short chain branching distribution index (SCBDI) equal to or greater than 50 percent obtainable by polymerization of ethylene with at least one $C_3$–$C_{20}$ α-olefin in the presence of a single site or constrained geometry catalyst; (B) at least one ethylene Polymer (B) having a density at least 0.005 g/cm$^3$ greater than the density of ethylene Polymer (A) and a TREF elution temperature at least 5° C. greater than the TREF elution temperature of ethylene Polymer (A) and, optionally, (C) at least one ethylene Polymer (C) having a density at least 0.005 g/cm$^3$ greater than the density of ethylene Polymer (B) and a TREF elution temperature at least 5° C. greater than the TREF elution temperature of ethylene Polymer (B), and (2) optionally a filler at least partially dispersed with a compatibilizer in the polymer mixture, and when less than 10 wt % filler is dispersed in the polymer mixture, then the melt index of Polymer (A) is preferably less than or equal to 1.5 g/10 min., the melt index ratio of Polymer (B) to Polymer (A) is preferably less than or equal to 5.0, and/or Polymer (B) is preferably a homogeneously branched ethylene polymer. Floor, wall and ceiling covering materials and processes for making them according to this invention are also described.

32 Claims, No Drawings

U.S. PATENT DOCUMENTS

| | | | |
|---|---|---|---|
| 4,937,299 | 6/1990 | Ewen et al. | 526/119 |
| 5,015,749 | 5/1991 | Schmidt et al. | 556/179 |
| 5,026,798 | 6/1991 | Canich | 526/127 |
| 5,041,584 | 8/1991 | Crapo et al. | 556/179 |
| 5,041,585 | 8/1991 | Deavenport et al. | 556/179 |
| 5,055,438 | 10/1991 | Canich | 502/117 |
| 5,057,475 | 10/1991 | Canich et al. | 502/104 |
| 5,064,802 | 11/1991 | Stevens et al. | 502/155 |
| 5,091,352 | 2/1992 | Kioka et al. | 502/103 |
| 5,096,867 | 3/1992 | Canich | 502/103 |
| 5,132,380 | 7/1992 | Stevens et al. | 526/126 |
| 5,153,157 | 10/1992 | Hlatky et al. | 502/117 |
| 5,183,867 | 2/1993 | Welborn, Jr. | 526/114 |
| 5,189,192 | 2/1993 | LaPointe et al. | 556/11 |
| 5,198,401 | 3/1993 | Turner et al. | 502/155 |
| 5,231,106 | 7/1993 | Knutsen et al. | 514/340 |
| 5,272,236 | 12/1993 | Lai et al. | 526/348.5 |
| 5,278,272 | 1/1994 | Lai et al. | 526/348.5 |
| 5,288,762 | 2/1994 | Park et al. | 521/79 |
| 5,292,845 | 3/1994 | Kawasaki et al. | 526/336 |
| 5,321,106 | 6/1994 | LaPointe | 526/126 |
| 5,374,696 | 12/1994 | Rosen et al. | 526/126 |
| 5,407,617 | 4/1995 | Oppermann et al. | 264/46.4 |
| 5,453,410 | 9/1995 | Kolthammer et al. | 502/155 |
| 5,470,993 | 11/1995 | Devore et al. | 556/11 |
| 5,486,632 | 1/1996 | Devore et al. | 556/11 |
| 5,494,879 | 2/1996 | Jin et al. | 502/314 |
| 5,849,823 * | 12/1998 | Kale et al. | 524/232 |
| 6,008,262 * | 12/1999 | McKay et al. | 521/51 |

SHEET MATERIALS SUITABLE FOR USE AS A FLOOR, WALL OR CEILING COVERING MATERIAL, AND PROCESSES AND INTERMEDIATES FOR MAKING THE SAME

CROSS REFERENCE TO RELATED APPLICATIONS

This application claims the benefit of U.S. Provisional application Ser. No. 60/055,263 filed Aug. 8, 1997 and U.S. Provisional application Ser. No. 60/057,278 filed Aug. 29, 1997.

FIELD OF INVENTION

This invention relates to sheet materials suitable for use as floor, wall or ceiling coverings, and processes and intermediates for making the same. The present invention particularly relates to floor, wall or ceiling coverings made of one or more non-polyvinyl chloride (non-PVC) polymeric layers.

BACKGROUND OF THE INVENTION

Materials for floor, wall and ceiling coverings should possess a wide variety of properties which are sometimes not compatible. An important property of materials for floor, wall and ceiling coverings is a good conformability to uneven or contoured surfaces to allow efficient application of the material to floors and walls. Particularly important for materials used for floor coverings are good wear, abrasion, scratch and indentation resistance and good indentation recovery to reduce visible scratches and indentations of furniture and rolling objects, such as office chairs.

Well known floor coverings are based on polyvinyl chloride (PVC). PVC-based materials have many desirable properties, such as good filler acceptance, flexibility and scratch resistance. However, in more recent years attention has focused on the disadvantages of PVC-based flooring.

Typical PVC covering construction includes a PVC-plastisol based covering. The plastisol typically consists of PVC particles, plasticizer, heavy metal additives and inorganic filler. The covering layer is formed in a spreading process by laying-down the plastisol on a fabric or release paper substrate and subsequently curing the plastisol. The PVC covering layer is typically manufactured using a calendering or roll mill process. In such processes, rigid PVC requires plasticizers and heavy metal stabilizers. Plasticizers have a tendency to migrate, which results in a gradual deterioration in resiliency and build up of a sticky residue that can lead to dirt accumulation, and the plasticizers can form pathways in the polymer for dye migration which can render printed patterns less distinct. The hydrogen chloride and heavy metal ash from decomposition of the heavy metal stabilizers are undesired consequences from the incineration of scrap associated with manufacturing and installation of PVC-based covering materials.

PVC-based coverings are known to be more difficult to recycle than polyolefin polymers, but attempts to produce covering materials from recyclable, or at least safely incineratable, thermoplastic polyolefin polymer compositions have been limited by currently available manufacturing technology. They have been more difficult to process on conventional equipment used to make PVC coverings. Whether manufactured using a spreading process or a calendering process, in order to avoid an excessive number of seams or joints when installed, PVC coverings are typically manufactured as endless webs having widths up to 4 or 5 meters. This width requirement is generally considered to significantly limit the possible products and/or processes available for providing suitable alternatives for PVC coverings. See, for example, the disclosure by Oppermann et al. in U.S. Pat. No. 5,407,617 at Col. 1, lines 32–36. In particular, known processes for manufacturing crosslinked thermoplastic floor covering materials are said to be limited to widths of about 2 meters due to die width limitations. See, U.S. Pat. No. 5,407,617 at Col. 2, lines 8–28.

Another difficulty with the use of thermoplastic polymers as substitutes for PVC is that they lack a good balance of flexibility to mechanical strength and controlled softening ability at the elevated temperatures often used by installers to thermoform a large sheet of covering material around tight-fitting spaces and other obstacles, so that such materials tend to break or tear during such installation.

No present single material can entirely fulfill the wide range of required and incompatible properties. Therefore, the desired properties are prioritized based on the desired end-use of the floor, wall and ceiling coverings and the materials are accordingly selected. To increase the variety of materials and material properties which are suitable for floor, wall and ceiling coverings, it would be highly desirable to provide floor, wall and ceiling coverings based on other polymers than those used in the prior art. It would be particularly desirable to provide floor, wall and ceiling coverings which have a good balance of desired properties, particularly sufficient flexibility and conformability to uneven or contoured surfaces for efficient application to floors, walls or ceilings, sufficient scratch resistance, sufficient indentation recovery, sufficient abrasion resistance, and sufficiently low coefficients of friction to avoid excess dirt build-up.

SUMMARY OF THE INVENTION

One aspect of this invention is sheet material suitable for use as a floor, wall or ceiling covering material comprising 1) a polymer mixture having:
   (A) at least one homogeneously branched ethylene Polymer (A) having a molecular weight distribution, $M_w/M_n$, less than about 3 and a short chain branching distribution index (SCBDI) equal to or greater than about 50 percent obtainable by polymerization of ethylene with at least one $C_3$–$C_{20}$ α-olefin in the presence of a single site or constrained geometry catalyst;
   (B) at least one ethylene Polymer (B) having a density at least 0.005 g/cm$^3$ greater than the density of ethylene Polymer (A) and a TREF elution temperature at least 5° C. greater than the TREF elution temperature of ethylene Polymer (A) and, optionally,
   (C) at least one ethylene Polymer (C) having a density at least 0.005 g/cm$^3$ greater than the density of ethylene Polymer (B) and a TREF elution temperature at least 5° C. greater than the TREF elution temperature of ethylene Polymer (B), and 2) optionally a filler at least partially dispersed with a compatibilizer in the polymer mixture, wherein the weight ratio of ethylene Polymer (B) to the total amount of ethylene Polymers (A) and (C) in the polymer mixture is at least 0.5, the weight ratio of any ethylene Polymer (C) to ethylene Polymer (A) does not exceed 2.0, and the total amount of ethylene Polymer (A) and any ethylene Polymer (C) in the polymer mixture is at least about 25 wt % based on the total amount of polymers in the polymer mixture, and when less than about 10 wt % filler is dispersed in the polymer mixture, than the melt index of Polymer (A) is preferably less than or equal to about 1.5 g/10 min., the melt index ratio of Polymer (B) to Polymer (A) is preferably less than or equal to about 5.0, and/or Polymer (B) is preferably a homogeneously branched ethylene polymer.

Another aspect of this invention is polymer resin-based floor, wall and ceiling coverings comprising at least one layer of the above-described sheet material.

In another aspect, the present invention relates to the use of a mixture of the above-mentioned ethylene Polymers (A), (B) and, optionally, (C) for producing floor, wall or ceiling coverings. Such use includes, but is not limited to, use in a process for the production of a sheet material suitable for use as a floor, wall or ceiling covering which comprises:

(1) providing the above-mentioned ethylene Polymers (A), (B), and optionally (C);

(2) mixing the ethylene polymers of step (1) at an elevated temperature sufficient for melting those polymers, but below a temperature which causes substantial degradation of those polymers, to form a fluid mixture;

(3) forming the fluid mixture of step (2) into a sheet; and (4) allowing the sheet of step (3) to cool and solidify.

A further aspect of this invention is intermediates for making a sheet material suitable for use as a floor, wall or ceiling covering material comprising a pelletized polymer mixture of the above-mentioned ethylene Polymers (A), (B) and, optionally, (C).

DETAILED DESCRIPTION OF THE INVENTION

By the term "floor, wall or ceiling covering" as used herein is meant an article with a length and width which are substantially greater than its thickness, such as a sheet, tile or board, which is useful to cover at least a portion of a floor, wall or ceiling and which adheres to the floor, wall or ceiling by means of static pressure or a fastening agent, such as an adhesive system. "Substantially greater" generally means at least 10 times greater, preferably at least 50 times greater, more preferably at least 100 times greater.

By the term "wall covering" or "ceiling covering" as used herein is meant an above-mentioned article, such as a sheet, tile or board, which is useful to cover at least a portion of a wall or of a ceiling and which adheres to the wall or ceiling by means of a fastening agent, such as an adhesive system, nails or screws.

The term "unfilled composition" means a polymer mixture having less than about 10, preferably less than or equal to about 5, more preferably less than or equal to about 1, wt % filler dispersed within it.

The term "melt processing" as used herein refers to processing or working a polymer composition at temperatures elevated above its melting point in an extruder, calender, Haake mixer, Banbury, Henschel mixer, Brabender mixer, or Buss mixer.

Percentages, ratios and the like are by weight unless stated otherwise. The abbreviatioin "cc" means "cubic centimeters" (i.e., $cm^3$). The abbreviation "MI" means "melt index ($I_2$)". Unless otherwise specified below, properties such as MI, density, melting point, mechanical properties and surface properties are measured as defined below under the heading "TESTING".

The term "interpolymer" is used herein to indicate a polymer wherein at least two different monomers are polymerized to make the interpolymer.

The term "copolymer" is used herein to indicate a polymer wherein two different monomers are polymerized to make the copolymer.

For the purpose of describing this invention, the term "ethylene polymer" refers to a polymer in which at least about 60 weight percent, preferably at least about 70 weight percent, of the repeating units in the polymer are derived directly from ethylene. That term includes homogeneously branched ethylene polymers such as substantially linear ethylene polymers (SLEPs) (which are sold under the designation of AFFINITY and ENGAGE resins by The Dow Chemical Company and Dupont Dow Elastomers, respectively), homogeneously branched linear ethylene polymers (such as those sold under the designation of TAFMER and EXACT resins by Mitsui Chemical Corporation and Exxon Chemical Corporation, respectively), heterogeneously branched linear ethylene polymer (such as those sold under the designation of ATTANE and DOWLEX by The Dow Chemical Company and under the designation of FLEXOMER by Union Carbide Corporation) and ethylene/propylene interpolymers having at least 60 percent of its units derived directly from ethylene. Ethylene Polymer (A) is required to be a homogeneously branched ethylene polymer.

The term "homogeneously branched ethylene polymer" means an ethylene interpolymer in which the comonomer is randomly distributed within a given polymer molecule and wherein substantially all of the polymer molecules have the same ethylene to comonomer molar ratio. The term refers to an ethylene interpolymer that is characterized by a relatively high short chain branching distribution index (SCBDI) or composition distribution branching index (CDBI). That is, the interpolymer has a SCBDI greater than or equal to about 50 percent, preferably greater than or equal to about 70 percent, more preferably greater than or equal to about 90 percent and generally lacks a measurable high density (crystalline) polymer fraction.

SCBDI is defined as the weight percent of the polymer molecules having a comonomer content within 50 percent of the median total molar comonomer content and represents a comparison of the monomer distribution in the interpolymer to the monomer distribution expected for a Bernoullian distribution. The SCBDI of an interpolymer can be readily calculated from data obtained from techniques known in the art, such as, for example, temperature rising elution fractionation (abbreviated herein as "TREF") as described, for example, by Wild et al., *Journal of Polymer Science, Poly. Phys. Ed.*, Vol. 20, p. 441 (1982), or in U.S. Pat. No. 4,798,081, or by L. D. Cady, "The Role of Comonomer Type and Distribution in LLDPE Product Performance," SPE Regional Technical Conference, Quaker Square Hilton, Akron, Ohio, October 1–2, pp.107–119 (1985). However, the preferred TREF technique does not include purge quantities in SCBDI calculations. More preferably, the monomer distribution of the interpolymer and SCBDI are determined using $^{13}C$ NMR analysis in accordance with techniques described in U.S. Pat. No. 5,292,845 and by J. C. Randall in Rev. Macromol. Chem. Phys., C29, pp. 201–317.

In addition to referring to a homogeneous (or narrow) short branching distribution, the term "homogeneously branched linear ethylene interpolymer" also means the interpolymer does not have long chain branching. That is, the ethylene interpolymer has an absence of long chain branching and a linear polymer backbone in the conventional sense of the term "linear." However, the term "homogeneously branched linear ethylene polymer" does not refer to high pressure branched polyethylene which is known to those skilled in the art to have numerous long chain branches. Homogeneously branched ethylene polymers can be made using polymerization processes (e.g., those described by Elston in U.S. Pat. No. 3,645,992) which provide a uniform (narrow) short branching distribution (i.e., homogeneously branched). In his polymerization process, Elston uses soluble vanadium catalyst systems to make such polymers, however others such as Mitsui Chemical Corporation and Exxon Chemical Corporation have used so-called single site catalyst systems to make polymers having a similar homogeneous structure. Homogeneously branched linear ethylene polymers can be prepared in solution, slurry or gas phase processes using hafnium, zirconium and vanadium catalyst systems. Ewen et al. in U.S. Pat. No. 4,937,299 describes a method of preparation using metallocene catalysts.

The term "substantially linear ethylene polymer" as used herein refers to homogeneously branched ethylene/α-olefin interpolymers that have a narrow short chain branching distribution and contain long chain branches as well as short chain branches attributable to homogeneous comonomer incorporation. The long chain branches are of the same structure as the backbone of the polymer and are longer than the short chain branches. The polymer backbone of substantially linear a-olefin polymers is substituted with an average of 0.01 to 3 long chain branch/1000 carbons. Substantially linear ethylene polymers have certain processing advantages. When those advantages are desired, preferred substantially linear polymers for use in the invention are substituted with from 0.01 long chain branch/1000 carbons to 1 long chain branch/1000 carbons, and more preferably from 0.05 long chain branch/1000 carbons to 1 long chain branches/1000 carbons.

Long chain branching is defined herein as a chain length of at least 6 carbons, above which the length cannot be distinguished using $^{13}C$ nuclear magnetic resonance spectroscopy. Long chain branches are of greater length than the short chain branches resulting from comonomer incorporation.

The presence of long chain branching can be determined in ethylene homopolymers by using $^{13}C$ nuclear magnetic resonance (NMR) spectroscopy and is quantified using the method described by Randall (*Rev. Macromol. Chem. Phys.*, C29, V. 2&3, p. 285–297).

As a practical matter, current $^{13}C$ nuclear magnetic resonance spectroscopy cannot determine the length of a long chain branch in excess of six carbon atoms. However, there are other known techniques useful for determining the presence of long chain branches in ethylene polymers, including ethylene/1-octene interpolymers. Two such methods are gel permeation chromatography coupled with a low angle laser light scattering detector (GPC-LALLS) and gel permeation chromatography coupled with a differential viscometer detector (GPC-DV). The use of these techniques for long chain branch detection and the underlying theories have been well documented in the literature. See, for example, Zimm, G. H. and Stockmayer, W. H., J. Chem. Phys., 17, 1301 (1949) and Rudin, A., *Modern Methods of Polymer Characterization*, John Wiley & Sons, New York (1991) pp. 103–112.

A. Willem deGroot and P. Steve Chum, both of The Dow Chemical Company, at the Oct. 4, 1994 conference of the Federation of Analytical Chemistry and Spectroscopy Society (FACSS) in St. Louis, Mo., presented data demonstrating that GPC-DV is a useful technique for quantifying the presence of long chain branches in substantially linear ethylene interpolymers. In particular, deGroot and Chum found that the level of long chain branches in substantially linear ethylene homopolymer samples measured using the Zimm-Stockmayer equation correlated well with the level of long chain branches measured using $^{13}C$ NMR.

Further, deGroot and Chum found that the presence of octene does not change the hydrodynamic volume of the polyethylene samples in solution and, as such, one can account for the molecular weight increase attributable to octene short chain branches by knowing the mole percent octene in the sample. By deconvoluting the contribution to molecular weight increase attributable to 1-octene short chain branches, deGroot and Chum showed that GPC-DV may be used to quantify the level of long chain branches in substantially linear ethylene/octene copolymers.

deGroot and Chum also showed that a plot of Log($I_2$, Melt Index) as a function of Log(GPC Weight Average Molecular Weight) as determined by GPC-DV illustrates that the long chain branching aspects (but not the extent of long branching) of substantially linear ethylene polymers are comparable to that of high pressure, highly branched low density polyethylene (LDPE) and are clearly distinct from ethylene polymers produced using Ziegler-type catalysts such as titanium complexes and ordinary homogeneous catalysts such as hafnium and vanadium complexes.

The term "heterogeneously branched linear ethylene polymer" is used herein in the conventional sense in reference to a linear ethylene interpolymer having a comparatively low short chain branching distribution index. That is, the interpolymer has a relatively broad short chain branching distribution. Heterogeneously branched linear ethylene polymers have a SCBDI less than about 50 percent and more typically less than about 30 percent.

Heterogeneously branched ethylene polymers are well known among practitioners of the linear polyethylene art. Heterogeneously branched ethylene polymers are prepared using conventional Ziegler-Natta solution, slurry or gas phase polymerization processes and coordination metal catalysts as described, for example, by Anderson et al. in U.S. Pat. No. 4,076,698. These conventional Ziegler-type linear polyethylenes are not homogeneously branched, do not have any long-chain branching and have a linear polymer backbone in the conventional sense of the term "linear." Also, heterogeneously branched ethylene polymers do not show any substantial amorphism at lower densities since they inherently posses a substantial high density (crystalline) polymer fraction. At densities less than about 0.90 g/cc, these materials are more difficult to prepare than homogeneously branched ethylene polymer and are also more difficult to pelletize than their higher density counterparts. At such lower densities, heterogeneously branched ethylene polymer pellets are generally more tacky and have a greater tendency to clump together than their higher density counterparts.

The term "ethylene/propylene interpolymer" as used herein refers to polymer having at least ethylene and propylene interpolymerized therein. Unless otherwise specified, such interpolymer may have a higher ethylene content than propylene and vice versa and include other monomers such as, for example, at least one diene or at least other α-olefin.

Typically, the homogeneously branched linear ethylene polymer and the heterogeneously branched ethylene polymer are ethylene/α-olefin interpolymers, wherein the α-olefin is at least one $C_3$–$C_{20}$ α-olefin (e.g., propylene, 1-butene, 1-pentene, 4-methyl-1-pentene, 1-hexene, 1-octene and the like) and preferably the at least one $C_3$–$C_{20}$ α-olefin is 1-hexene. Most preferably, the ethylene/α-olefin interpolymer is a copolymer of ethylene and a $C_3$–$C_{20}$ α-olefin, especially an ethylene/$C_4$–$C_6$ α-olefin copolymer and most especially an ethylene/1-hexene copolymer.

Included among the preferred homogeneously branched ethylene polymers for use in the present invention are substantially linear ethylene polymers due to their improved melt extrusion processability and unique rheological properties as described by Lai et. al in U.S. Pat. Nos. 5,272,236 and 5,278,272.

Substantially linear ethylene polymers differ significantly from the class of polymers conventionally known as homogeneously branched linear ethylene polymers described, for example, by Elston in U.S. Pat. No. 3,645,992, in that substantially linear ethylene polymers do not have a linear polymer backbone in the conventional sense of the term "linear." Substantially linear ethylene polymers also differ significantly from the class of polymers known conventionally as heterogeneously branched traditional Ziegler polymerized linear ethylene interpolymers (for example, ultra low density polyethylene, linear low density polyethylene or high density polyethylene made, for example, using the technique disclosed by Anderson et al. in U.S. Pat. No. 4,076,698, in that substantially linear ethylene interpolymers are homogeneously branched interpolymers. Substantially linear ethylene polymers also differ significantly from the class known as free-radical initiated highly branched high pressure low density ethylene homopolymer and ethylene interpolymers such as, for example, ethylene-acrylic acid (EAA) copolymers and ethylene-vinyl acetate (EVA) copolymers, in that substantially linear ethylene polymers do not have equivalent degrees of long chain branching and are made using single site catalyst systems rather than free-radical peroxide catalysts systems.

Single site polymerization catalyst, (for example, the monocyclo-pentadienyl transition metal olefin polymerization catalysts described by Canich in U.S. Pat. No. 5,026,798 or by Canich in U.S. Pat. No. 5,055,438) or constrained geometry catalysts (for example, as described by Stevens et al. in U.S. Pat. No. 5,064,802) can be used to prepare substantially linear ethylene polymers, so long as the catalysts are used consistent with the methods described in U.S. Pat. No. 5,272,236 and in U.S. Pat. No. 5,278,272. Such polymerization methods are also described in PCT/US 92/08812 (filed Oct. 15, 1992). However, the substantially linear ethylene polymers are preferably made by using suitable constrained geometry catalysts, especially constrained geometry catalysts [as the catalysts used to make the SLEPs used in this invention] and methods for their preparation [are] disclosed in EP-A-416,815 and EP-A-514,828 as well as in U.S. Pat. Nos. 5,470,993; 5,374,696; 5,231,106; 5,055,438; 5,057,475; 5,091,352; 5,096,867; 5,064,802; 5,132,380; 5,153,157; 5,183,867; 5,189,192; 5,198,401; 5,272,236; 5,278,272; 5,321,106; 5,453,410; 5,470,993; 5,486,632; 5,494,879 and 5,532,394.

In EP-A-514,828, certain borane derivatives of metallocene complex catalysts are disclosed and a method for their preparation taught and claimed in U.S. Pat. No. 5,453,410 combinations of cationic metallocene complex catalysts with an alumoxane were disclosed as suitable olefin polymerization catalysts.

Suitable cocatalysts for use herein include but are not limited to, for example, polymeric or oligomeric aluminoxanes, especially methyl aluminoxane or modified methyl aluminoxane (made, for example, as described in U.S. Pat. No. 5,041,584, U.S. Pat. No. 4,544,762, U.S. Pat. No. 5,015,749, and/or U.S. Pat. No. 5,041,585 as well as inert, compatible, non-coordinating, ion forming compounds. Preferred cocatalysts are inert, non-coordinating, boron compounds.

The polymerization conditions for manufacturing the substantially linear ethylene polymers useful in the present invention are preferably those useful in the continuous solution polymerization process, although the application of the present invention is not limited thereto.

The substantially linear ethylene polymers that may be used in the present invention may be characterized as having
 (a) a melt flow ratio, $I_{10}/I_2 \geq 5.63$,
 (b) a molecular weight distribution, $M_w/M_n$, as determined by gel permeation chromatography and defined by the equation:

$$(M_w/M_n) \leq (I_{10}/I_2) - 4.63,$$

(c) a gas extrusion rheology such that the critical shear rate at onset of surface melt fracture for the substantially linear ethylene polymer is at least about 50 percent greater than the critical shear rate at the onset of surface melt fracture for a linear ethylene polymer, preferably wherein the substantially linear ethylene polymer and the linear ethylene polymer comprise the same comonomer or comonomers, the linear ethylene polymer has an $I_2$, $M_w/M_n$ and density within ten percent of the substantially linear ethylene polymer and wherein the respective critical shear rates of the substantially linear ethylene polymer and the linear ethylene polymer are measured at the same melt temperature using a gas extrusion rheometer,
 (d) preferably a single differential scanning calorimetry, DSC, melting peak between −30 and 150° C., and
 (e) a short chain branching distribution index greater than about 50 percent.

The substantially linear ethylene polymers that may be used in this invention are homogeneously branched interpolymers and essentially lack a measurable "high density" fraction as measured by the TREF technique (i.e., have a narrow short chain distribution and a high SCBD index). The substantially linear ethylene polymer generally do not contain a polymer fraction with a degree of branching less than or equal to 2 methyls/1000 carbons. The "high density polymer fraction" can also be described as a polymer fraction with a degree of branching less than about 2 methyls/1000 carbons.

The substantially linear ethylene interpolymers that may be used in the present invention are interpolymers of ethylene with at least one $C_3$–$C_{20}$ α-olefin and/or $C_4$–$C_{18}$ diolefin. Copolymers of ethylene and an α-olefin of $C_3$–$C_{20}$ carbon atoms are especially preferred. The term "interpolymer" is used herein to indicate a copolymer, or a terpolymer, or the like, where, at least one other comonomer is polymerized with ethylene to make the interpolymer.

Suitable unsaturated comonomers useful for polymerizing with ethylene include, for example, ethylenically unsaturated monomers, conjugated or non-conjugated dienes, polyenes, etc. Examples of such comonomers include $C_3$–$C_{20}$ α-olefins as propylene, isobutylene, 1-butene, 1-hexene, 4-methyl-1-pentene, 1-heptene, 1-octene, 1-nonene, 1-decene, 1,9-decadiene and the like. Preferred comonomers include propylene, 1-butene, 1-hexene, 4-methyl-1-pentene, 1-octene, and 1,9-decadiene is especially preferred. Other suitable monomers include styrene, halo- or alkyl-substituted styrenes, tetrafluoroethylene, vinylbenzocyclobutane, 1,4-hexadiene, 1,7-octadiene, and cycloalkenes, e.g., cyclopentene, cyclohexene and cyclooctene.

Determination of the critical shear rate and critical shear stress in regards to melt fracture as well as other rheology properties such as "rheological processing index" (PI), is performed using a gas extrusion rheometer (GER). The gas extrusion rheometer is described by M. Shida, R. N. Shroff and L. V. Cancio in *Polymer Engineering Science*, Vol.17, No.11, p. 770 (1977), and in "Rheometers for Molten Plastics" by John Dealy, published by Van Nostrand Reinhold Co. (1982) on pp. 97–99. GER experiments are performed at a temperature of about 190° C., at nitrogen pressures between about 250 to about 5500 psig (about 1.83 to about 38.03 Mpa) using about a 0.0754 mm diameter, 20:1 L/D die with an entrance angle of about 180°. For the substantially linear ethylene polymers described herein, the PI is the apparent viscosity (in kpoise, whereby 1 kpoise equals 100 Pa.s) of a material measured by GER at an apparent shear stress of about $2.15 \times 10^6$ dyne/cm$^2$ (which is equivalent to 21.5 N/cm$^2$). The substantially linear ethylene polymer for use in the invention are ethylene interpolymers having a PI in the range of about 0.01 kpoise to about 50 kpoise (about 1 to about 5000 Pa.s), preferably about 15 kpoise (about 1500 Pa.s) or less. The substantially linear ethylene polymers used herein have a PI less than or equal to about 70 percent of the PI of a linear ethylene interpolymer (either a conventional Ziegler polymerized interpolymer or a linear homogeneously branched interpolymer as described by Elston in U.S. Pat. No. 3,645,992) having an $I_2$, $M_w/M_n$ and density, each within ten percent of the substantially linear ethylene interpolymer.

An apparent shear stress versus apparent shear rate plot is used to identify the melt fracture phenomena and quantify the critical shear rate and critical shear stress of ethylene polymers. According to Ramamurthy in the *Journal of Rheology*, 30(2), 337–357, 1986, above a certain critical flow rate, the observed extrudate irregularities may be broadly classified into two main types: surface melt fracture and gross melt fracture.

Surface melt fracture occurs under apparently steady flow conditions and ranges in detail from loss of specular film gloss to the more severe form of "sharkskin." Herein, as determined using the above-described GER, the onset of surface melt fracture (OSMF) is characterized at the beginning of losing extrudate gloss at which the surface roughness of the extrudate can only be detected by 40× magnification. The critical shear rate at the onset of surface melt fracture for the substantially linear ethylene interpolymers is at least about 50 percent greater than the critical shear rate at the onset of surface melt fracture of a linear ethylene interpolymer having essentially the same $I_2$ and $M_w/M_n$.

Gross melt fracture occurs at unsteady extrusion flow conditions and ranges in detail from regular (alternating rough and smooth, helical, etc.) to random distortions. For commercial acceptability and maximum wear layer scratch and abrasion properties, surface defects should be minimal, if not absent. The critical shear stress at the onset of gross melt fracture for the substantially linear ethylene interpolymers used in the invention, that is those having a density less than about 0.91 g/cc, is greater than about $4 \times 10^6$ dynes/cm$^2$. The critical shear rate at the onset of surface melt fracture (OSMF) and the onset of gross melt fracture (OGMF) will be used herein based on the changes of surface roughness and configurations of the extrudates extruded by a GER. Preferably, in the present invention, the substantially linear ethylene polymer will be characterized by its critical shear rate, rather than its critical shear stress.

Substantially linear ethylene polymers also consist of a single polymer component material and are characterized by a single differential scanning calorimeter (DSC) melting peak. The single melting peak is determined using a DSC standardized with indium and deionized water. The method involves about 5–7 mg sample sizes, a "first heat" to about 140° C. which is held for about 4 minutes, a cool down at about 10°/min. to about −30° C. which is held for about 3 minutes, and heat up at about 10° C./min. to about 180° C. for the "second heat". The single melting peak is taken from the "second heat" heat flow vs. temperature curve. Total heat of fusion of the polymer is calculated from the area under the curve.

For substantially linear ethylene interpolymers having a density of about 0.875 g/cc to about 0.91 g/cc, the single melting peak may show, depending on equipment sensitivity, a "shoulder" or a "hump" on the low melting side that constitutes less than about 12 percent, typically, less than about 9 percent, and more typically less than about 6 percent of the total heat of fusion of the polymer. Such an artifact is observable for other homogeneously branched polymers such as EXACT resins and is discerned on the basis of the slope of the single melting peak varying monotonically through the melting region of the artifact. Such an artifact occurs within about 34° C., typically within about 27° C., and more typically within about 20° C. of the melting point of the single melting peak. The heat of fusion attributable to an artifact can be separately determined by specific integration of its associated area under the heat flow vs. temperature curve.

The molecular weight distributions of ethylene α-olefin polymers are determined by gel permeation chromatography (GPC) on a Waters 150C high temperature chromatographic unit equipped with a differential refractometer and three columns of mixed porosity. The columns are supplied by Polymer Laboratories and are commonly packed with pore sizes of $10^3$, $10^4$, $10^5$ and $10^6$ Å($10^{-4}$, $10^{-3}$, $10^{-2}$ and $10^{-1}$ mm). The solvent is 1,2,4-trichlorobenzene, from which about 0.3 percent by weight solutions of the samples are prepared for injection. The flow rate is about 1.0 milliliters/minute, unit operating temperature is about 140° C. and the injection size is about 100 microliters.

The molecular weight determination with respect to the polymer backbone is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Ward in *Journal of Polymer Science*, Polymer Letters, Vol. 6, p. 621, 1968) to derive the following equation:

$$M_{polyethylene} = a * (M_{polystyrene})^b.$$

In this equation, a=0.4316 and b=1.0. Weight average molecular weight, $M_w$, is calculated in the usual manner according to the following formula: $M_j = (\Sigma w_i(M_i^j))^j$; where $w_i$ is the weight fraction of the molecules with molecular weight $M_i$ eluting from the GPC column in fraction i and j=1 when calculating $M_w$ and j=−1 when calculating $M_n$.

For the homogeneously branched ethylene interpolymers used in the present invention, the $M_w/M_n$ is preferably less than about 3, more preferably less than about 2.5, and especially from about 1.5 to about 2.5 and most especially from about 1.8 to about 2.3.

Substantially linear ethylene polymers are known to have excellent processability, despite having a relatively narrow molecular weight distribution (for purposes of this invention, the $M_w/M_n$ ratio is generally less than about 3.0, preferably less than about 2.5, and more preferably less than about 2). Surprisingly, unlike homogeneously and heterogeneously branched linear ethylene polymers, the melt flow ratio ($I_{10}/I_2$) of substantially linear ethylene polymers can be varied essentially independently of the molecular weight distribution, $M_w/M_n$. Accordingly, the preferred ethylene α-olefin polymer for use in the present invention is a substantially linear ethylene polymer.

Preferred Ranges:
Polymer mixture (parts indicated as weight %)
25 to 100 wt. % of at least one ethylene polymer made by homogeneous catalysis;
0 to 75 wt. % of at least one ethylene polymer made by Ziegler-Natta or chromium (conventional) catalysis,
0 to 35 wt. % polypropylene isotactic homopolymer or random copolymer or impact copolymer
0 to 25 wt. % high pressure ethylene homopolymer or ethylene interpolymer with carbon monoxide, methylvinyl ketone, acrylic acid, vinyl acetate, methylacrylate, ethylacrylate, butylacrylate, butene-1, propylene, vinyl silane units such as vinyl trimethoxysilane, triethoxysilane, etc.

Polymer (A)

Polymer (A) is a homogeneously branched ethylene polymer, preferably a substantially linear ethylene polymer (for processing reasons), as described earlier.

Polymer (A) has a melt index ($I_2$) which is preferably less than or equal to about 25, more preferably about 5, even more preferably about 1.5, yet even more preferably about 1, g/10 min. and which is preferably at least about 0.01, more preferably about 0.05, and even more preferably about 0.1, g/10 min., such as about 0.4 g/10 min., Polymer (A) also preferably has melt flow index ($I_{10}/I_2$) less than or equal to about 10.

The density of Polymer (A) is preferably less than or equal to about 0.920, more preferably from about 0.910, even more preferably about 0.895, g/cc. and preferably at least about 0.855, more preferably about 0.865, and even more preferably about 0.875, g/cc, such as about 0.885 g/cc.

Polymer (B)

Polymer (B) may be any type of ethylene polymer, but preferably it is homogeneously branched and more preferably substantially linear, as described earlier.

Polymer (B) has a preferred melt index ($I_2$) less than or equal to about 25, more preferably about 10, even more preferably about 2, g/10 min., and preferably at least about 0.1, more preferably about 0.5 and even more preferably about 0.7, g/10 min., such as about 1.2 g/10 min. Polymer (B) also preferably has melt flow index ($I_{10}/I_2$) less than or equal to about 10. The ratio of the melt index of Polymer (B) to Polymer (A) is preferably greater than or equal to 1, more preferably greater than or equal to 1.1, and even more preferably greater than or equal to 1.5 and preferably less than or equal to 5.0, and even more preferably less than or equal to 3.0.

The preferred density of Polymer (B) is less than or equal to about 0.965, even more preferably about 0.915, g/cc and preferably at least about 0.865, more preferably about 0.885, and even more preferably about 0.895, g/cc, such as about 0.902 g/cc. The density of this component exceeds that of Polymer (A) by at least 0.005, preferably by at least 0.010, g/cc.

The TREF elution temperature of Polymer (B) exceeds that of Polymer (A) by at least 5° C., preferably at least 10°, C. The TREF elution temperature is defined herein as the temperature at which the maximum amount of polymer is eluted during TREF (also referred to as the "peak elution temperature").

Alternatively, the melting point of Polymer (B) as measured by DSC preferably exceeds that of Polymer (A) by at least 5° C., preferably by at least 10° C.

Optional Polymer (C)

Polymer (C) may be any type of ethylene polymer, but it is preferably homogeneously branched.

Polymer (C) preferably has an MI less than or equal to about 25, more preferably about 20, g/10 min. and preferably at least about 1, more preferably at least about 5, g/10 min. The MI ratio of the Polymer (C) to Polymer (B) is preferably at least 1, more preferably at least 1.1, and even more preferably at least 1.5, and preferably less than or equal to 5.0, and even more preferably less than or equal to 3.0. Polymer (C) also preferably has melt flow index ($I_{10}/I_2$) less than or equal to 10.

The preferred density of Polymer (C) is in the range from about 0.875 to about 0.965, more preferably from about 0.895 to about 0.965, g/cc. The density of this component exceeds that of Polymer (B) by at least 0.005, preferably by at least 0.010, g/cc.

The TREF elution temperature of Polymer (C) exceeds that of Polymer (B) by at least 5° C., preferably at least 10° C. The TREF elution temperature is defined herein as the temperature at which the maximum amount of polymer is eluted during TREF (also referred to as the "peak elution temperature").

Alternatively, the melting point of Polymer (C) as measured by DSC exceeds that of Polymer (B) by at least 5° C., preferably by at least 10 C.

The Combination of Polymers (A), (B) and optional (C)

The polymer mixture of the sheet material of this invention contains about 25, preferably at least about 30, more preferably at least about 35 (such as about 40), weight percent Polymer (A).

The weight ratio of Polymer (B) to the total amount of Polymers (A) and optional (C) in the polymer mixture is at least 0.5, preferably at least 0.9, even more preferably at least 1.2.

The weight ratio of optional Polymer (C) to Polymer (A) does not exceed 2.0, preferably does not exceed 1.0, more preferably does not exceed 0.5.

The preferred overall MI of the polymer mixture (A), (B) and optional (C) is in the range from about 0.1 to about 25, more preferably from about 0.3 to about 5, g/10 min. For an unfilled composition, the MI of the mixture is preferably at least about 0.5 g/10 min. and preferably less than or equal to about 1.5 g/10 min. Preferably, the MI of the overall polymer mixture is in the range from about 0.8 to about 5 g/10 min. for filler levels at 40 to 60%. For filled systems a somewhat higher MI, such as in the range from about 1 to about 5, may be needed in order to allow processing with conventional equipment. The preferred range is therefore dependent on filler type, level, and particle size. The preferred overall molecular weight distribution ($M_w/M_n$) is preferably less than or equal to about 3.0. The polymer mixture also preferably has a preferred melt flow index ($I_{10}/I_2$) less than or equal to about 10.

The density of the polymer mixture (as measured in accordance with ASTM D-792) for use in the present invention is generally greater than about 0.850 g/cc, especially from about 0.860 g/cc to about 0.930 g/cc, more preferably, from about 0.880 g/cc to about 0.920 g/cc and most preferably, at least 0.880 g/cc and less than or equal to 0.910 g/cc. A particularly well suited density for unfilled compositions (for homogeneous flooring) is in the range from 0.880 to 0.905 g/cc, for instance 0.895 g/cc. For rubber flooring, the preferred density is in the range from 0.865 to 0.885 g/cc. When used as or in the foam layer, the preferred polymer density of the polymer mixture is less than or equal to about 0.915 g/cc, especially less than or equal to about 0.900 g/cc. When used as or in the upper wear layer and/or print layer, the preferred polymer density of the polymer mixture is greater than or equal to about 0.91 g/cc, especially greater than or equal to about 0.92 g/cc. Preferably at least 50, more preferably at least 80, and even more preferably 100, wt. % of Polymers (A), (B) and, optionally (C) have densities with the above specified general and preferred density ranges.

The DSC melting points of Polymers (A), (B) and, optional (C) when those polymers are in admixture with each other is sometimes offset from the DSC melting points of the same polymers measured independently of one another. Nevertheless, in a preferred embodiment the difference in DSC melting points of Polymers (A) and (B), and Polymers (B) and optional (C), respectively, when two or more of those polymers are in admixture with one another is at least 5, more preferably at least 10, C.

Fillers (D):

The sheet material of the present invention may contain 0 to 90 wt % of a filler of inorganic- (talc, $CaCO_3$, Dolomite, $SiO_2$, aluminium trihydrate etc.) or organic-type (wood, UHMWPE, cellulose, etc.). The preferred amount of filler greatly varies, depending on the desired stiffness and mode of application of the floor, wall or ceiling covering. Floor, wall or ceiling sheetings preferably do not contain a filler. However, if they contain a filler, the amount of the filler preferably is from 10 to about 70 percent, more preferably from about 15 to about 50, even more preferably from about 30 to about 50, such as about 55, percent, based on the total weight of the sheeting. Floor tiles, wall tiles or ceiling tiles may contain from about 50 to about 90 percent of a filler, based on the weight of the floor, wall or ceiling covering.

The amount of added organic filler is preferably low. However, other demands (i.e. haptic, feel, etc.) may require the addition of some organic filler. The typical amount of organic filler in the homogeneous unfilled flooring is lower than 20 wt %. Typically 8 to 16 wt % may be used.

A certain level of inorganic filler may be added based on other considerations (costs, flame/ignition retardant requirements). The level of this type is preferred to remain low to get the best balance of properties according to this invention. The preferred level of inorganic filler in the sheet material of this invention is typically in the range of 15 to 65 wt %, more specifically between 20 to 60 wt %.

Useful organic and inorganic fillers include saw dust, wood fillers, such as wood flour or wood fibers, paper fibers, corn husks, straw, cotton, carbon black or graphite, talc, calcium carbonate, flyash, alumina trihydrate, glass fibers, marble dust, cement dust, clay, feldspar, silica or glass, fumed silica, alumina, magnesium oxide, zinc oxide, barium sulfate, aluminum silicate, calcium silicate, titanium dioxide, titanates, glass microspheres or chalk. Of these fillers, barium sulfate, talc, calcium carbonate, barium sulfate, silica/glass, glass fibers, alumina and titanium dioxide, and mixtures thereof are preferred. The term "a filler" as used herein includes a mixture of different fillers.

Additive (E):

The additive components are a minor part of the formulations of this invention. Typically, less than 5 wt % is used. Examples of typical additives include: antioxidants, such as hindered phenols or phosphites; light stabilizers, such as hindered amines; plasticizers, such as dioctylphthalate or epoxidized soy bean oil; tackifiers, such as known hydrocarbon tackifiers; waxes, such as polyethylene waxes; processing aids, such as stearic acid or a metal salt thereof; crosslinking agents, such as peroxides or silanes; colorants or pigments to the extent that they do not interfere with the good conformability to uneven or contoured surfaces, scratch resistance and/or indentation recovery of the floor, wall or ceiling covering of the present invention. The additives are employed in functionally equivalent amounts known to those skilled in the art, generally in amounts of up to about 30, preferably from about 0.01 to about 5, more preferably from about 0.02 to about 1 percent by weight, based upon the weight of the floor, wall or ceiling covering.

More particularly, additives such as antioxidants (e.g., hindered phenolics such as IRGANOX® 1010 or IRGANOX® 1076, each available from Ciba Geigy Corp.), phosphites (e.g., IRGAFOS® 168, available from Ciba Geigy Corp.), and PEPQ™ (a trademark of Sandoz Chemical, the primary ingredient of which is believed to be a biphenylphosphonite) as well fire retardant additives (e.g., antimony, magnesium hydroxide and aluminum trihydroxide (ATH)), pigments, colorants, and the like can also be included in the polyolefin polymers, to the extent that they do not interfere with the desired abuse, transparency or foam properties. However, with respect to antioxidants and stabilizers, only nominal quantities such as 100 to 2500 ppm will generally be required to successfully melt process the preferred polyolefin polymers used in the present invention.

Fabricated layers such as for lamination operations may also contain additives to enhance handling, antiblocking and coefficient of friction characteristics including, but not limited to, untreated and treated silicon dioxide, talc, calcium carbonate, and clay, as well as primary and secondary fatty acid amides, silicone coatings, etc. Still other additives, such as quaternary ammonium compounds alone or in combination with ethylene acrylic acid (EM) copolymers or other functional polymers, commercial anti-static additives (e.g., HOSTASTAT™, a glycerin fatty acid ester available from Hoechst Corp., IRGASTAT™ available from Ciba Geigy and ATMER available from ICI) and hydrophobic fillers such as, for example, talc can also be added to the polyolefin polymer for the purpose of meeting surface and volume resistivity standards.

Compatabilizers are often added to formulations containing one or more fillers to compatabilize the filler(s) with the polymer mixture components. Examples of compatabilizers include acrylic acid, maleic anhydride (MAH), fumaric acid or other polar monomer grafted onto polyolefins or incorporated as copolymers in an interpolymer, such as MAH grafted high density polyethylene (MAH-HDPE), MAH grafted polypropylene (MAH-PP) for instance EPOLENE™ E43P available from Eastman Kodak Company, ADMER™ available from Mitsui Chemical Corporation, PRIMACORE™ available from The Dow Chemical Company and SURLYN™ available from DuPont.

The sheet materials of this invention may also contain foaming agents. Foaming agents are described later in more detail.

Oils (F):

Various oils can be compounded into the polyolefin polymer to reduce formulation costs, enhance flexibility and filler acceptability and/or to reduce dusting during compounding. Suitable oils include, for example, paraffinic and hydrogenated oils (e.g., SUNPAR available from Sun Oil Company and MEDINOL available from Witco) although naphthenic and aromatic oils may also be used. In general, the amount of oil that can be successfully added without incurring signs of incompatibility such as, for example, bleed-out, will increase as the viscosity of the oil decreases and/or the crystallinity of the polyolefin polymer decreases.

In one embodiment, the sheet material of this invention comprises:

(1) 40 weight percent of the polymer mixture, such as one comprising 40 weight percent of Polymer (A) for instance having a melt index of about 0.4 g/10 min. and a density of about 0.885 g/cm$^3$ and 60 weight percent of polymer (B) for instance having a melt index of about 1.2 g/10 min. and a density of about 0.902 g/cm$^3$;

(2) 55 weight percent of a filler such as one comprising 72 weight percent calcium carbonate and 28 weight percent SILITIN™; and (3) 5 weight percent of a compatabilizer, such as MAH-grafted HDPE.

The floor, wall or ceiling covering of the present invention preferably is substantially free of halogen-containing compounds, such as polyvinyl chloride, polyvinylidene chloride, or halogen-containing flame retardants. By the term "substantially free of halogen-containing compounds" is meant that halogen-containing compounds usually do not amount to more than about 10 percent, preferably not more than about 5 percent, more preferably not more than about 2 percent, most preferably not more than about 1 percent, based on the total weight of the floor, wall or ceiling covering. Most preferably, the floor, wall or ceiling covering of the present invention does not contain any measurable amount of halogen-containing compounds.

The polymer mixture also preferably comprises less than a substantial amount of polypropylene. By the term "less than a substantial amount of polypropylene is meant the polypropylene does not amount to more than 20 wt %, more preferably not more than 10 wt %, and even more preferably not more than 5 wt % polypropylene in the polymer mixture.

The polymer blend or mixture may be formed by any convenient method, including dry blending the individual polymers and subsequently melt mixing in a mixer or by mixing the polymers together directly in a mixer (e.g., a Banbury mixer, a Haake mixer, a Brabender internal mixer, or a single or twin screw extruder including a compounding extruder and a side-arm extruder employed directly down stream of a interpolymerization process).

Preferably, the polymer mixtures of the present invention are prepared using two reactors operated in series or in parallel, or by in-reactor blending using two or more catalysts in a single reactor or combinations of multiple catalysts and multiple reactors. The general principle of making polymer blends by in-reactor blending using two or more catalysts in a single reactor or combinations of multiple catalysts and multiple reactors is described in WO 93/13143; EP-A-619827; and U.S. Pat. No. 3,914,342. The polymer mixtures can be prepared by selecting appropriate catalyst and process conditions with a view to the final composition characteristics.

In a preferred embodiment, a blend of Polymers (A), (B) and optionally (C) is prepared by a dual reactor process using the solution polymerization process described in U.S. Pat. No. 5,272,236; U.S. Pat. No. 5,278,272 and other Dow Chemical Company patents mentioned above. In one embodiment, a parallel configuration is preferred in which the output of two reactors, one producing Polymer (A) and the other producing Polymer (B) is combined, the solvent is removed and then optional Polymer (C), if any, is added to the resulting melted polymer mixture, such as via a side-arm extruder and mixed prior to cooling. The polymer melt can be used directly or cooled and pelletized for remelting, combining the melt with optional additional components such as components (D), (E), and/or (F) described above, and forming a sheet material or covering material.

The floor, wall or ceiling covering of the present invention generally has a thickness of from about 0.025 mm to about 25 mm, preferably from about 0.1 mm to about 10 mm. Floor coverings preferably have a thickness from about 1 mm to about 10 mm, more preferably from about 1 mm to about 5 mm, most preferably from about 1.5 mm to about 4 mm. Wall coverings preferably have a thickness from about 0.1 to about 3 mm, more preferably from about 0.5 to about 2 mm, most preferably from about 0.5 to about 1.5 mm.

In one preferred embodiment of the present invention, the floor, wall or ceiling covering of the present invention is a monolayer structure which contains the above described substantially random interpolymer(s) and optional additive (s). The thickness of such a monolayer structure is preferably from about 0.025 mm to about 15 mm, more preferably from about 1.5 mm to about 4 mm.

In another preferred embodiment of the present invention, the floor, wall or ceiling covering contains at least two layers wherein at least one layer (A) comprises one or more of the above-described substantially random interpolymer(s). The layer(s) (A) preferably contains at least about 25 percent, more preferably at least about 50 percent, even more preferably at least about 75 percent, and yet even more preferably at least about 80 percent, up to 100 percent, of ethylene Polymers (A), (B) and, optionally, (C), based on the total amount of polymer in layer(s) A. Layer(s) (A) can comprise one or more optional polymers other than ethylene Polymers (A), (B) and, optionally, (C), and/or other additional additives, such as a filler, as described above. The amount of a filler, if present, is generally from 0 percent to about 80 percent, preferably from 0 percent to about 60 percent, more preferably from about 20 percent to about 60 percent, based on the total weight of layer(s) (A). The thickness of layer (A) is preferably from about 0.025 mm to about 2 mm, preferably from about 0.060 mm to about 1 mm, more preferably from about 0.1 mm to about 1 mm.

Layer (A) can represent the top layer, the bulk layer and/or the bottom layer or the floor, wall or ceiling covering of the present invention. Regardless whether layer (A) is the top, bulk or bottom layer, it improves the mechanical properties of the floor, wall or ceiling covering material, which allows easier application and which enables the floor, wall or ceiling covering to stay flat on the floor or wall and withstand heavy use. Furthermore, layer (A) generally provides good indentation resistance to the multilayer structure, regardless of whether layer (A) represents the top, bulk or bottom layer.

Preferably, layer (A) represents the top layer. It provides excellent scratch, abrasion and discoloration resistance to the multilayer structure, while maintaining a sufficiently low coefficient of friction and sufficiently low energy surface to reduce dirt adhesion.

The floor, wall or ceiling covering of the present invention contains an above-described layer (A) and may contain one or more additional polymeric layers (B). Preferred polymers in such a additional polymeric layer(s) (B) are monovinylidene aromatic polymers (such as those derived from styrene, vinyl toluene, α-methylstyrene, t-butyl styrene, chlorostyrene, including all isomers of these compounds), styrenic block copolymers, or additional homopolymers or interpolymers of aliphatic α-olefins having from 2 to about 20 carbon atoms or α-olefins having from 2 to about 20 carbon atoms and containing polar groups. Alternatively, layer (B) can comprise one or more substantially random interpolymer(s) prepared by polymerizing one or more α-olefin monomers with one or more vinylidene aromatic monomers and/or one or more hindered aliphatic or cycloaliphatic vinylidene monomers, and optionally with other polymerizable ethylenically unsaturated monomer(s). The layer(s) (B) preferably contain at least 25 percent, more preferably at least 50 percent, even more preferably at least 75 percent, of the described ethylene polymer(s), based on the total weight of the layer(s) B. Layer(s) (B) can comprise one or more additional, optional polymers and/or one or more other optional additives, such as a filler, as described above. Preferably, the polymer mixture does not contain a substantial amount of polypropylene and it is preferably substantially PVC free. The amount of a filler, if present, is preferably present in an amount from about 10 to about 90 wt %, preferably from 10 to 75 wt %, more preferably from about 30 wt % to about 50 wt %, based on the total weight of layer(s) (B).

The thickness ratio between layer (A) and layer (B) is preferably from about 0.01:1 to about 10:1, more preferably from about 0.1:1 to about 5:1, most preferably from about 0.2:1 to about 5:1.

The floor, wall or ceiling covering of the present invention can comprise one or more additional layers which are common in floor, wall or ceiling coverings, such as one or more adhesive layers, one or more reinforcement layers, and/or one or more decorative layers. The decorative layer can be arranged on top of layer (A), however, preferably it is arranged between layer (A) and layer (B). In one embodiment, the floor and wall covering product of the present invention has a resilient cushion foam backing layer which is integrated with a top structure. The top structure is a substrate for a resilient cushion foam backing layer and comprises a transparent polymeric upper wear layer, an optional polymeric print layer and an optional polymeric or textile intermediate reinforcement layer. One or more, preferably all, of these layers may be made according to the present invention.

The above-described mixture of ethylene Polymers (A), (B) and, optionally, (C) can be combined with optional additives and processed to make the floor and wall covering of the present invention by any suitable means known in the art such as, but not limited to, Banbury mixing, extrusion compounding, roll milling, calendering, compression molding, injection molding and/or sheet extrusion. Useful temperatures for melt processing the polymers in combination with optional additives to the floor, wall and ceiling covering of the present invention generally are from about 100° C. to about 300° C., preferably from about 120° C. to about 250° C., more preferably from about 140° C. to about 200° C. When using kneaders and internal mixers such as Haake torque mixers and Brabender, polyolefin processing temperatures are generally maintained at from about 150° to about 180° C. When using compounding extruder (whether twin screw extruder or single screw extruder), processing temperatures are generally maintained at from about 170° to about 190° C. When using two-roll mills, processing temperatures are generally maintained at from about 160° to 190° C. For melt processing by 24 roll calendering, the calender temperature is generally maintained at from about 150° to 170° C. and friction ratios similar to PVC may be employed such as, for example, friction ratios from about 1:1 to about 1:3, preferably from about 1:1 to about 1:2.

The floor, wall or ceiling covering of the present invention may be foamed or may comprise one or more foam layers. Specifically, the layer(s) containing the above-described substantially random interpolymer(s) and/or one or more of the above-described additional polymeric layer(s), if present, may be foamed.

The foam layer(s) may be produced by an extrusion process or from expandable or foamable particles, moldable foam particles, or beads from which a sheet is formed by expansion and/or coalescing and welding of those particles.

The foam structure may be made by a conventional extrusion foaming process. The structure is generally prepared by heating a polymer material to form a plasticized or melt polymer material, incorporating therein a known blowing agent to form a foamable gel, and extruding the gel through a die to form the foam product. Prior to mixing with the blowing agent, the polymer material is heated to a temperature at or above its glass transition temperature or melting point. The blowing agent may be incorporated or mixed into the melt polymer material by any means known in the art such as with an extruder, mixer or blender. The blowing agent is mixed with the melt polymer material at an elevated pressure sufficient to prevent substantial expansion of the melt polymer material and to generally disperse the blowing agent homogeneously therein. Optionally, a nucleator may be blended in the polymer melt or dry blended with the polymer material prior to plasticizing or melting. The foamable gel is typically cooled to a lower temperature to optimize physical characteristics of the foam structure. The gel is then extruded or conveyed through a die of desired shape to a zone of reduced or lower pressure to form the foam structure. The die can have a substantially rectangular orifice to produce a sheet of the desired width and height. Alternatively, the die can have multiple orifices to produce polymer strands which can be cut to beads. The zone of lower pressure is at a pressure lower than that in which the foamable gel is maintained prior to extrusion through the die. The lower pressure may be superatmospheric or subatmospheric (vacuum), but is preferably at an atmospheric level.

Suitable melt processing-foaming techniques include roll milling, Haake torque mixing, kneadering, calendering, extrusion casting and hot blown film fabrication wherein prior to the melt processing, the mixture of ethylene polymers is compounded with about 0.5 to about 5 weight percent, preferably about 1 to about 3.5 weight percent of a suitable chemical blowing agent such as, for example, but not limited to, azodicarbonamide, with or without a suitable kicker such as a metal oxide (e.g., zinc oxide) and without a foam stabilizer, such as, for example, sodium sulphosuccinimate, as is typically required for aqueous latex foams.

The foam structure may also be formed into foam beads suitable for molding into articles. To make the foam beads, discrete resin particles such as granulated resin pellets are suspended in a liquid medium in which they are substantially insoluble such as water; impregnated with a blowing agent by introducing the blowing agent into the liquid medium at an elevated pressure and temperature in an autoclave or other pressure vessel; and rapidly discharged into the atmosphere or a region of reduced pressure to expand to form the foam beads. This process is well taught in U.S. Pat. No. 4,379,859 and U.S. Pat. No. 4,464,484.

The foam beads may then be molded by any means known in the art, such as charging the foam beads to the mold, compressing the mold to compress the beads, and heating the beads such as with steam to effect coalescing and welding of the beads to form the article. Optionally, the beads may be impregnated with air or other blowing agent at an elevated pressure and temperature prior to charging to the mold. Further, the beads may be heated prior to charging. The foam beads may then be molded to sheets by a suitable molding method known in the art. Some of the methods are taught in U.S. Pat. No. 3,504,068 and U.S. Pat. No. 3,953,558.

Various additives may be incorporated in the foam structure, such as stability control agents, nucleating agents, inorganic fillers, pigments, antioxidants, acid scavengers, ultraviolet absorbers, flame retardants, processing aids or extrusion aids. Some of the additives are described in more detail above.

Also, the polymer foam may be crosslinked (whether microcellular or not) by various methods such as those described in U.S. Pat. No. 5,288,762 and by C. P. Park in "Polyolefin Foam," *Handbook of Polymer Foams and Technology*, Chapter 9,Hanser Publishers, New York (1991). Suitable crosslinking methods include adding a crosslinking agent (e.g., dicumyl peroxide) to the polymers prior to extrusion or by irradiating the polymers prior to or after foaming or by using an extruder in the melt processing which has a long-land die such as described in GB Patent No. 2,145,961A to effectuate thermal oxidative crosslinking.

The floor sheeting, floor tiles, wall sheeting and wall tiles according to this invention is useful in buildings and in geological areas, for example in caves or tunnels as PVC replacement. The floor, wall or ceiling coverings of the present invention have a number properties which make them particularly suitable for the intended end-use. Depending on the chosen types and amounts of substantially random interpolymer(s) and optional additives, the floor and wall coverings of the present invention have some or all of these properties, such as good indentation resistance, indentation recovery, good flexibility and conformability over contoured or uneven surfaces, good scratch resistance and/or good abrasion resistance.

One commercial benefit of the present invention is that it does not have the substantial environmental impact ordinarily associated with PVC flooring and wall covering products. That is, the inventive product does not require heavy metal stabilizers, nitrosamines derived from curing agents or accelerators, plasticizers with a high volatile organic content, nor chlorine containing polymers and is low in ash after incineration. Thus, the inventive product can be conveniently recycled using conventional energy recovery methods based on incineration.

Another benefit of the invention is that the polymer mixture can be melt processed on ordinary PVC equipment such as a two-roll mill and three-roll calender equipment. Melt processing equipment such as calender rolls present a particularly aggressive thermal environment in that the polymer melt is substantially exposed to atmospheric oxygen. Ordinary polyolefin polymers such as ethylene vinyl acetate (EVA) copolymers are generally too thermally sensitive to be melt processed on PVC equipment and as such are employed in flooring systems by alternate techniques such as powder scattering and sintering. Another commercial benefit is ease of shipping and installation. Whereas a non-filled PVC flooring or wall covering product typically has a bulk density of 1.3 kg/liter, the inventive product is lightweight (i.e., is preferably characterized as having a bulk density of from about 0.8 to about 0.9 kg/liter) and yet generally exhibits the performance durability of PCV covering. It also retains sufficient strength and moldability at elevated temperatures to allow installers to heat the material with a heat gun to bend and mold it around obstacles and into confined spaces, such as are found in saunas and boiler rooms. It also have the advantage that it does not require heating to cut it. It cuts easily at room temperature.

Generally common adhesives, such as acrylic or styrene/butadiene based adhesives can be used to fix the floor, wall or ceiling covering on floor, walls or ceilings. The use of adhesion promoters, such as surface oxidation via corona or flame treatment or acrylic primers in combination with these adhesives is generally not necessary.

The inventive products have a superior balance of mechanical and surface properties. A high balance indicates the ability to reconcile inconsistent objectives. That can be measured through the use of the following equations.

1. Mechanical Properties $$\frac{(\% \text{ recovery@150 min.}) \times (\% \text{ strain @break}) \times (MPa \text{ stress@ at break})}{(\text{flexural modulus in } MPa) \times (\text{Shore } D \text{ hardness})} \geq X$$

wherein X is a numeric value which is preferably 200, more preferably 400, even more preferably 600, and the remaining values are explained in the Testing section below. The % recovery is preferably at least about 90, more preferably at least about 95, and even more preferably at least 100, percent. The percent strain at break is preferably at least about 500, more preferably at least about 600. The stress at break is preferably greater than or equal to about 10, more preferably about 20, and even more preferably about 25, MPa. The flexural modulus is preferably less than or equal to about 200, more preferably about 90, and even more preferably about 70, MPa.

2. Surface Properties (ISO 4586-2 Scratch Depth in $\mu$m @ 5N)×(Taber Abrasion in mg/100 revs)×(DIN Abrasion in mm$^3$)×(ASTM D-1894 Coefficient of Friction)$\leq$Y, wherein Y is a numeric value which is preferably 300, more preferably 200 and even more preferably 150, and the remaining values are explained in the Testing section below. Scatch depth at 5 N is preferably less than or equal to 60, more preferably 50, microns. Taber abrasion is preferably less than or equal to 0.50, more preferably 0.40 mg/100 revs. DIN abrasion is preferably less than or equal to 14, more preferably 12, mm$^3$. The coefficient of friction is preferably less than or equal to 0.5, more preferably 0.4 and even more preferably less than 0.3.

3. Mechanical and Surface Properties of Covering Material $$\frac{(\text{Ultimate Tensile Strength}) \times (\text{Ultimate Elongation})}{(\text{Shore } D \text{ Hardness}) \times (DIN \text{ Abrasion})} \geq Z,$$

wherein Z is a numeric value which is preferably 20, more preferably 30 and even more preferably 40.

4. Mechanical Properties at Elevated Temperatures

Preferably, the % strain at break at 90° C. is at least 150, more preferably at least 300, and even more preferably at least 400.

The following examples are provided to illustrate the present invention. The examples are not intended to limit the scope of the present invention and they should not be so interpreted. Amounts are in weight parts or weight percentages unless otherwise indicated.

TESTING

The properties of the polymers and blends are determined by the following test procedures:

Density is measured according to ASTM D-792.

TREF elution temperature is the peak elution temperature of the polymer component during TREF.

Melting point is the DSC melting peak of the polymer measured by cooling a sample of the polymer weighing about 5 mg from 180° C. to −30° C. at 10° C./min., holding at constant temperature fo 1 min. and heating the sample at 10° C./min. while continuously measuring and recording the temperature differential between the polymer sample and the temperature to which it is exposed.

Melt Index (MI) is determined by ASTM D-1238 (1979), Condition E (190° C.; 2.16 kg).

Hardness is measured using a Hardness Tester for Shore A and D according to DIN 53505.

Tensile strength, secant modulus, and elongation properties are measured using ASTM D 638, Type C.

Scratch testing is carried out using an Erichson Universal Scratch Tester equipped with a 90°–180 μm diameter stylus. A load of 0.1 to 1.0 N is applied to this stylus, and the resulting scratch width is measured after 30 days by a Perthen Surface Profiler. Scratch depth is measured according to ISO 4586-2 and is expressed in micrometers. Scratch resistance is measured according to ISO 4586-5. Test results shown below are for stylus pressure of 5 Newtons.

Taber abrasion is measured according to ASTM F510-93.

Flexural modulus is measured using ASTM D 790-95A.

DIN abrasion is determined according to DIN 53516, measured at 10 N.

Ultimate tensile strength and elongation are measured according to DIN 53504, specimen S2, 50 mm/min. cross head speed.

Coefficient of friction is measured according to ASTM D-1894, sample to metal.

Indention resistance, i.e. the original indention after 150 min., and % recovery are measured according to DIN 51955.

MATERIALS USED IN THE EXAMPLES

The materials used in the Examples and Comparative Examples are described below:

| Product Name | Melt Index (gm/10 min) | Density (gm/cc) |
|---|---|---|
| DSH 8501.00 POP (ethylene-1-octene copolymer available from The Dow Chemical Co. which is made using a constrained geometry catalyst) | 1.0 | 0.871 |
| DSH 1500.00 (Single site cat.) (ethylene-1-octene copolymer available from The Dow Chemical Co. which is made using a constrained geometry catalyst) | 1.0 | 0.902 |
| DPF 1340 (ethylene/1-octene copolymer blend made by The Dow Chemical Co. which is made using constrained geometry catalyst) | — | — |
| FW 1650 (ethylene copolymer made by The Dow Chemical Co. which is made using a constrained geometry catalyst) | — | — |
| AFFINITY ™ VP 8770 POP (ethylene-1-octene copolymer available from The Dow Chemical Co. which is made using a constrained geometry catalyst) | 1.0 | 0.885 |
| AFFINITY ™ SL 1170 (ethylene copolymer blend made by The Dow Chemical Co. which is made using constrained geometry catalyst) | | |
| HD KS 10100 (high density polyethylene available from The Dow Chemical Co. which is made using the solution process) | 4.0 | 0.955 |
| HD 25055E (high density polyethylene available from The Dow Chemical Co. which is made using the solution process) | 25.0 | 0.955 |
| HD 53050E (high density polyethylene available from The Dow Chemical Co. which is made using the solution process slurry process) | 0.3 $I_5$ | 0.952 |
| Maleic anhydride graft DHPE polyethylene compatibilizer containing 1.2% maleic acid made by The Dow Chemical Co. | 1.0 | 0.955 |
| PRIMACOR ™ 4311 Compatibilizer available from The Dow Chemical Co. produced by reacting with acrylic acid to make a copolymer via the high pressure process. | 11.0 | 0.932 |
| Neste XZ 1051 F Random PP copolymer available from Neste Corp. | | |
| APPRYL ™ GN3 (Random Copolymer Polypropylene, Melting Point 144 C.) | 1.8 at 230° C. | |
| Buna 437 ex BSL (Sequential EPDM, 1.5–3% Ethylene Norbornene, 72% Ethylene, + PP balance, Mooney Viscosity 60, available from Bayer Corp.) | | |
| IRGANOX ™ 1010 is a sterically hindered phenol antioxidant available from Ciba Geigy Corp. | | |
| HOSTASTAT ™ FE-2, Antistatic agent available from Hoechst Corp. (glycerin fatty acid ester) | | |
| SFR 100, Silicon oil, high viscosity., available from General Electric | | |
| PDMS 4-7051, High molecular weight polydimethyl siloxane available from Dow Corning | | |

PROCESSING CONDITIONS

Examples 1–10 below are prepared by melt processing the respective polymers premixed as a dry blend on a ZSK extruder at 180–200° C. The resulting polymer blend is cooled, pelletized and later remelted and compression molded into plaques with fast cooling using a Burkle Press under the conditions and procedures of ISO 1163/2.

The processing conditions used to prepare Examples 11–27 and Comparative Examples C-1 to C-5 below are as follows:

| BANBURY | |
|---|---|
| Charge (gm) | 1500 |
| Chamber temp. (° C.) | 150 |
| Rotor Speed (RPM) | 50 |
| Scale (Torque) (Nm) | 0–100 |
| ROLL MILL CONDITIONS AND PROCEDURE ISO 1163/2 | |
| Front Roll temp. (° C.) | 170 |
| Rear Roll temp. (° C.) | 160 |
| Friction (%) | 10 |
| Roll speed (RPM) | 15 (equals 7.1 m/min.) |
| BURKLE PRESS COMPRESSION MOULDING CONDITIONS AND PROCEDURE ISO 1163/2 | |
| Moulding temp. (° C.) | 170 |
| Preheat time | 5 min. with 10 bar pressure |
| Moulding time | 5 min. with 150 bar pressure |
| Cooling (° C.) | 40 |
| Thickness of Plates (mm) | 2 |

EXAMPLES 1–10 OF THE INVENTION

Examples 1–10 are formulated according to Table 3A below based on polymer components (A) and (B) described in Tables 1 and 2, respectively.

TABLE I

Low Density Polymer Component

| Polymer Component | MI ($I_2$) (g/10 min) | Density (g/cm³) | DSC Melting Point (° C.) | Type | Commercial Name (if any) |
|---|---|---|---|---|---|
| 1A | 1.0 | 0.885 | 81.9 | POP CGC | AFFINITY ™ VP8770 |
| 1B | 0.5 | 0.880 | ~72 | POP CGC | Low density fraction of DPF 1340 |
| 1C | 3.0 | 0.880 | ~72 | POP CGC | Low density fraction of AFFINITY ™ SL1170 |
| 1D | 0.5 | 0.893 | ~88 | POP CGC | |
| 1E | 1.0 | 0.885 | 88.7 | POP CGC | |
| 1F | 0.4 | 0.885 | 81 | POP CGC | |
| 1G | 0.4 | 0.880 | ~72 | POP CGC | |
| 1H | 1.0 | 0.870 | 58 | POE CGC | DSH 8501 |

TABLE 2

High Density Polymer Component

| Polymer Component | MI ($I_2$) (g/10 min) | Density (g/cm³) | DSC Melting Point (° C.) | Type | Commercial Name (if any) |
|---|---|---|---|---|---|
| 2A1 | 1.0 | 0.905 | 124.3 | HEC | ATTANE ™ SL4102 |
| 2A2 | 0.31₅ | 0.952 | ~130 | HDPE | HDPE 53050 |
| 2B | 4.7 | 0.928 | 126.1 | HEC | High density fraction of DPF 1340 |
| 2C | 1.9 | 0.923 | 126.9 | HEC | High density fraction of AFFINITY ™ SL1170 |
| 2D | 1.3 | 0.923 | 125.5 | HEC POP | |
| 2E1 | 3.0 | 0.902 | 96 | CGC HDPE | FW 1650 HD 25055E |
| 2E2 | 25 | 0.955 | ~128.6 | HEC | |
| 2F | 1.2 | 0.902 | 95.8 | POP CGC | |
| 2G | 1.2 | 0.905 | 125.6 | HEC POP | |
| 2H1 | 1.0 | 0.902 | 96 | CGC g-MAH | DSH 1500 |
| 2H2 | 1.0 | 0.955 | ~130 | HDPE | |
| 2H3 | 4.0 | 0.935 | ~125 | HEC | DOWLEX ™ 2429.10 |

TABLE 3A

Formulation of Examples

Parts by Weight in Examples 1 to 10 of the Invention

| Component | 1 | 2 | 3 | 4 | 5 | 6 | 6A | 6B | 7 | 8 | 9 | 10 |
|---|---|---|---|---|---|---|---|---|---|---|---|---|
| 1A | 36 | 34 | | | | | | | | | | |
| 1B | | | 40 | | | | | | | | | |
| 1C | | | | 25 | | | | | | | | |
| 1D | | | | | 40 | | | | | | | |
| 1E | | | | | | 55 | 55 | 55 | | | | |
| 1F | | | | | | | | | 40 | 36 | | |
| 1G | | | | | | | | | | | 40 | 38 |
| 2A1 | 54 | 51 | | | | | | | | | | |
| 2A2 | 10 | | | | | | | | | 5 | | 5 |
| 2B | | | 60 | | | | | | | | | |
| 2C | | | | 75 | | | | | | | | |
| 2D | | | | | 60 | | | | | | | |
| 2E1 | | | | | | 30 | 30 | 30 | | | | |
| 2E2 | | | | | | 15 | 15 | 15 | | 5 | | |
| 2F | | | | | | | | | 60 | 54 | | |
| 2G | | | | | | | | | | | 60 | 57 |
| MOPLEN ™ Q30P | | 15 | | | | | | | | | | |
| PDMS 4-701 | 1 | 1 | 1 | 1 | 1 | 1 | 1 | 1 | 1 | 1 | 1 | 1 |
| HOSTASTAT ™ FE-2 | 0.05 | 0.05 | 0.05 | 0.05 | 0.05 | 0.05 | 0.05 | 0.05 | 0.05 | 0.05 | 0.05 | 0.05 |
| Total Parts | 101 | 101 | 101 | 101 | 101 | 101 | 101 | 101 | 101 | 101 | 101 | 101 |

Examples 6A and 6B differ from Example 6 in that polymer blend has been modified with a silane curing system. Example 6A is prepared by adding 0.3 g TRIGONOX™ 101 (available from Akzo-Nobel), 0.37 cm³ dibutyltin dilaurate, 7.5 cm³ vinyl-trimethoxy silane and 14.9 g aluminum trihydrate. Example 6B is the same as Example 6A, except that the amount of TRIGONOX™ 101 is increased to 1.5 g.

Example 7 is a polymer blend made with dual reactor having constrained geometry catalyst in each of two reactors connected in parallel (CGC/CGC). The constrained geometry caatalyst used for making the homogenously branched substantially linear ethylene polymer is [(η5-Me$_4$C$_5$) SiMe$_2$N-t-Bu]Ti(η4-1,3-pentadiene). The cocatalyst, tris (pentafluorophenyl)borane, is available as a 3 wt % solution in Isopar™-E mixed hydrocarbon, from Boulder Scientific. The savenger is a solution of modified methylalumoxane (MMAO Type 3A) in heptane available at a 2 wt percent aluminum concentration from Akzo-Nobel Chemical Inc. The first reactor used to make the lower density ethylene/ 1-octene polymer is maintained at 95° C. Solvent (DSP 100–120 available from Exxon) is continuously fed to the stirred first reactor together with ethylene and 1-octene introduced at an ethylene to 1-octene weight ratio of 1.37:1. Catalyst, cocatalyst and scavanger are fed to the reactor in a molar ratio of 1:3:5, respectively. The same procedure is followed with respect to the second reactor, except that the second reactor is at 105° C. and the weight ratio of ethylene to 1-octene is 1.92:1. The blend exiting the dual reactor system has a melt index of 0.94 g/10 min., a melt flow ratio ($I_{10}/I_2$) of 9.77 and a density of 0.895 g/cc overall. 40 wt % of the blend contains a polymer component having a melt index of 0.4 g/10 min. and a density of 0.885 g/cc. The low and high density polymers correspond to Polymers (A) and (B) of the invention, respectively. Polymers (A) and (B) have TREF elution temperatures of 53° C. and 68° C., respectively, and DSC melting points of ~81 and 95° C.

This blend is stabilized with 1010 ppm calcium stearate, 404 ppm IRGANOX™ 1076 hindered polyphenol stabilizer (available from Ciba-Geigy Corporation), and 646 ppm PEPQ (tetrakis(2,4-di-t-butylphenyl)-4,4-biphenylene diphosphonite) (available from Clariant Corporation).

Examples 9 and 10 are also polymer blends made with a dual reactor system with the reactors connected in parallel, the constrained geometry catalyst of Example 7 in the first reactor, except that the system is operated with a Ziegler type catalyst, instead of the constrained geometry catalyst, in the second reactor (CGC/HEC). The Ziegler-type catalyst is prepared according to U.S. Pat. No. 4,612,300 (Example P), by sequentially adding to a volume of Isopar E, a slurry of anhydrous magnesium chloride in Isopar E, a solution of EtAlCl$_2$ in hexane, and a solution of Ti(O-iPr)$_4$ in Isopar E, to yield a composition containing a magnesium concentration of 0.17 M and a ratio of Mg/Al/Ti of 40/12/3. An aliquot of this composition containing 0.064 mmol of Ti is treated with a dilute solution of Et$_3$Al to give an active catalyst with a final Al/Ti ratio of about 3:1 to 4:1. The first reactor is maintained at 90° C. A solvent (DSP 100–120 available from Exxon) is continuously fed to the stirred first reactor together with ethylene and 1-octene in a weight ratio of 1.21:1. Catalyst, cocatalyst and scavanger are fed to the reactor in molar ratios of 1:3:5, respectively. The second reactor is operated similarly to the first reactor in that the same solvent is continuously fed to the stirred second reactor, together with ethylene and 1-octene, except that the ethylene to 1-octene weight ratio is 0.587 and the temperature of the second reactor is maintained at 184° C. The blend exiting the dual reactor system has an overall melt index of 0.92 g/10 min., a melt flow ratio of 8.03 and a density of 0.895 g/cc. 40% of the blend is a polymer component associated with the first reactor having a melt index of 0.4 g/10 min. and a density of 0.880 g/cc. The low and high density polymers correspond to Polymers (A) and (B) of this invention, respectively. Polymers (A) and (B) have TREF elution temperatures of 49° C. and 99° C., respectively, and have DSC melting points (~81° as shoulder), 97° and 125° C., respectively. This blend is stabilized with 1550 ppm calcium stearate, 625 ppm IRGANOX™ 1076 hindered polyphenol stabilizer, and 1000 ppm PEPQ.

For each of these examples, mechanical property values at 25° C. and 90° C. are shown in Tables 3B and 3C, respectively, and surface properties are shown in Table 3D. The balance of properties is shown in Table 3E and Table 3F shows the respective DSC determined melting points.

TABLE 3B

Mechanical Properties of Examples 1 to 10 at 25° C.

| | Mechanical Property Values | | | | | |
|---|---|---|---|---|---|---|
| Example | % Recovery | % Strain at Break | Stress at Break (MPa) | Flexural Modulus (MPa) | Shore D Hardness | Balance A[1] |
| 1 | 95 | 735 | 31 | 104 | 46 | 452 |
| 2 | 95 | 749 | 28 | 92 | 42 | 516 |
| 3 | 104 | 689 | 22 | 154 | 47 | 218 |
| 4 | 113 | 695 | 24 | 166 | 48 | 236 |
| 5 | 94 | 639 | 30 | 127 | 48 | 296 |
| 6 | 106 | 720 | 25 | 110 | 45 | 385 |
| 6A | 96 | 671 | 27 | 107 | 44 | 369 |
| 6B | 98 | 578 | 22 | 104 | 45 | 266 |
| 7 | 105 | 673 | 31 | 62 | 41 | 862 |
| 8 | 86 | 684 | 32 | 114 | 46 | 359 |
| 9 | 95 | 756 | 25 | 66 | 40 | 365 |
| 10 | 95 | 762 | 26 | 120 | 43 | 365 |

[1]Balance A = (% Recovery) × (% Strain @ Break) × (MPaStress @ Break) (Mpa Flexural modulus) × (Shore D Hardness)

TABLE 3C

Mechanical Properties of Examples 1 to 10 at 90° C.

| | Mechanical Property Values | | | | |
|---|---|---|---|---|---|
| Example | % Strain at Break | Stress (MPa) at Break | Stress (MPa) at Yield | Flexural Modulus (MPa) | Balance B[2] |
| 1 | 548 | 2.4 | 0.8 | 10 | 548 |
| 2 | 579 | 1.8 | 0.6 | 5 | 579 |
| 3 | 244 | 2.6 | 1.5 | 25 | 244 |
| 4 | 373 | 4.3 | 1.8 | 33 | 373 |
| 5 | 556 | 4.8 | 2.0 | 25 | 556 |
| 6 | 184 | 1.5 | 1.2 | 16 | 184 |
| 6A | 490 | 4.0 | 1.2 | 8 | 490 |
| 6B | 230 | 4.2 | 1.4 | 14 | 230 |
| 7 | 518 | 2.5 | 0.8 | 8 | 518 |
| 8 | 539 | 2.9 | 0.9 | 18 | 539 |
| 9 | 176 | 0.5 | 0.2 | 5 | 176 |
| 10 | 392 | 1.4 | 0.6 | 13 | 392 |

[2]Balance B = % Strain @ Break @ 90 C

TABLE 3D

Surface Properties of Examples 1 to 10 at 25° C.

| | Surface Property Values | | | | | |
|---|---|---|---|---|---|---|
| Examples | Coefficient of Friction | DIN Abrasion 10 N (mm3) | Taber Abrasion (mg/100 revs) | Scratch Resistance | Scratch Depth 5N (microns) | Balance C[3] |
| 1 | 0.48 | 12 | 0.6 | 1.3 | 84 | .34 |
| 2 | 0.54 | 19 | 0.8 | 1.4 | 69 | .18 |

TABLE 3D-continued

Surface Properties of Examples 1 to 10 at 25° C.

| | Surface Property Values | | | | | |
|---|---|---|---|---|---|---|
| Examples | Co-efficient of Friction | DIN Abrasion 10 N (mm3) | Taber Abrasion (mg/100 revs) | Scratch Resistance | Scratch Depth 5N (microns) | Balance $C^3$ |
| 3 | 0.32 | 11 | 0.8 | 1.4 | 83 | .43 |
| 4 | 0.27 | 11 | 0.7 | nd | 83 | .58 |
| 5 | 0.27 | 9 | 0.6 | 0.8 | 74 | .93 |
| 6 | 0.31 | 12 | 0.5 | 1.7 | 84 | .64 |
| 6A | 0.46 | 11 | 0.3 | nd | 66 | 1.00 |
| 6B | 0.54 | 11 | 0.8 | nd | 62 | .34 |
| 7 | 0.43 | 12 | 0.4 | 1.4 | 45 | 1.10 |
| 8 | 0.32 | 13 | 0.4 | 15 | 70 | .86 |
| 9 | 0.36 | 14 | 0.2 | 1.5 | 57 | 1.70 |
| 10 | 0.36 | 13 | 0.4 | 1.9 | 77 | .69 |

[3]Balance C = 1/(coeffic. of friction) × (DIN Abrasion) × (Taber Abrasion) × (Scratch Depth) × 100
"nd" means "not determinable" due to result below measurement threshold

TABLE 3E

Balance of Properties of Examples 1 to 10

| | Balance | | | | |
|---|---|---|---|---|---|
| Example | A | B | C | Product $A^4$ | Product $B^5$ |
| 1 | 452 | 548 | .34 | 154 | 842 |
| 2 | 516 | 579 | .18 | 93 | 538 |
| 3 | 218 | 244 | .43 | 94 | 229 |
| 4 | 236 | 373 | .58 | 137 | 511 |
| 5 | 296 | 556 | .93 | 275 | 1530 |
| 6 | 385 | 184 | .64 | 246 | 453 |
| 6A | 369 | 490 | 1.00 | 369 | 1808 |
| 6B | 266 | 230 | .34 | 90 | 208 |
| 7 | 862 | 518 | 1.10 | 948 | 4912 |
| 8 | 359 | 539 | .86 | 309 | 1664 |
| 9 | 365 | 176 | 1.70 | 620 | 1092 |
| 10 | 365 | 392 | .69 | 252 | 987 |

[4]Product A = Balance A × Balance C (performance of invention comprising topcoat at 25 C only)
[5]Product B = Balance A × Balance B × Balance C (performance of invention comprising topcoat at 25 C with 90 C installation)

TABLE 3F

DSC Melting Points (° C.)

| Example | Tm (1$^{ST}$) | Tm (2$^{ND}$) | Tm (3$^{RD}$) | Tm (4$^{Th}$) |
|---|---|---|---|---|
| 1 | 124.3 | 81.9 | — | — |
| 2 | 158.6 | 122.9 | 116.4 | 84.5 |
| 3 | 126.1 | 113 | — | — |
| 4 | 126.9 | 106.8 | — | — |
| 5 | 125.5 | 109.8 | 80 | — |
| 6 | 128.6 | 88.7 | — | — |
| 7 | 95.8 | 81 | — | — |
| 8 | nm | nm | — | — |
| 9 | 125.6 | 97 | — | — |
| 10 | nm | nm | — | — | nm = not measured

EXAMPLES 11–14 OF THIS INVENTION AND COMPARATIVE EXAMPLES C-1 to C-3

Examples 11–14 of this invention and Comparative Examples C-1 to C-3 are described in Table 4A, which again relies on the polymer descriptions in Tables 1 and 2. For each, Table 4B shows the balance of mechanical and surface property values. The balance calculation provides an indication of the degree to which each formulation reconciled inconsistent objectives.

TABLE 4A

Formulation of Examples

Parts by Weight in Examples 11 to 14 of the Invention and Comparative Examples C-1 to C-3

| Component | 11 | 12 | 13 | 14 | C-1 | C-2 | C-3 |
|---|---|---|---|---|---|---|---|
| 1F | | | | 16 | | | |
| 1H | 35 | 30 | 30 | | 20.6 | 30 | 30 |
| 2F | | | | 24 | | | |
| 2H1 | | | 10 | | | | |
| 2H2 | 5 | 10 | 5 | 5 | | 5 | |
| 2H3 | 10 | 10 | | | | | 10 |
| ARPYL ™3021 | | | | | 15 | | |
| GN3 | | | | | | | |
| Neste XZ1051 F | | | | | 9.4 | | |
| PRIMACOR ™ 4311 | | | | | | | 10 |
| Buna AP 437 | | | | | 2.6 | | |
| HOSTASTAT ™ FE-2 | | | | | 1.2 | | |
| Talc | 3 | 3 | | | 3.3 | 3 | 3 |
| Silitin N85 | 15 | 15 | 15 | 15 | 23 | 15 | 15 |
| Omya BSH | 35 | 35 | 40 | 40 | | 35 | 35 |
| Omyacarb 6 | | | | | 40 | | |
| Irganox 1010 | | | | | 0.1 | | |
| Total Parts | 103 | 103 | 100 | 100 | 100.2 | 103 | 103 |

TABLE 4B

Properties of Examples 11 to 14 and Comparative Examples 1 to 3 at 25° C.

| | Property Values | | | | |
|---|---|---|---|---|---|
| Example | Ultimate Tensile Strength | Ultimate Elongation (%) | Shore D Hardness | DIN Abrasion (mm$^3$) | Balance$^6$ |
| 11 | 9.8 | 452 | 47 | 109 | .86 |
| 12 | 12.2 | 320 | 50 | 111 | .70 |
| 13 | 14.1 | 779 | 43 | 170 | 1.50 |
| 14 | 14.3 | 574 | 51 | 154 | 1.05 |
| C-1 | 6.4 | 35 | 41 | 330 | .02 |
| C-2 | 14.5 | 59 | 52 | 161 | .10 |
| C-3 | 7.4 | 146 | 47 | 148 | .16 |

[6]Balance = (Ultimate Tensile Strength) × (Ultimate Elongation) / (Shore D Hardness) × (DIN Abrasion)

As can be seen from the calculated balance column, Examples 11–14 substantially outperformed the Comparative Examples. That result is unexpected from the teachings of the prior art.

EXAMPLES 15–27 OF THIS INVENTION AND COMPARATIVE EXAMPLES C4 AND C-5

Tables 5A1 and 5A2 describe the formulation of Examples 15–27 and Comparative Examples C-4 and C-5, basing polymer components 1 H and 2H1 on Tables 1 and 2.

TABLE 5A1

Formulation of Examples 15 to 23

Parts by Weight in Examples of the Invention and Comparative Examples

| Component | 15 | 16 | 17 | 18 | 19 | 20 | 21 | 22 | 23 |
|---|---|---|---|---|---|---|---|---|---|
| 1H | 60 | 50 | 40 | 60 | 45 | 30 | 40 | 60 | 45 |
| 2H1 | 40 | 50 | 60 | 30 | 45 | 60 | 40 | 30 | 45 |
| HDPE KS 10100 | | | | | | | | 10 | 10 |
| APRYL GN3-3021 | | | | 10 | 10 | 10 | 20 | | |
| SFR-100 Silicon | 1 | 1 | 1 | 1 | 1 | 1 | 1 | 1 | 1 |
| Mg-Stearate | 0.7 | 0.7 | 0.7 | 0.7 | 0.7 | 0.7 | 0.7 | 0.7 | 0.7 |
| HOSTASTAT FE-2 | 0.5 | 0.5 | 0.5 | 0.5 | 0.5 | 0.5 | 0.5 | 0.5 | 0.5 |
| Irganox 1010 | 0.1 | 0.1 | 0.1 | 0.1 | 0.1 | 0.1 | 0.1 | 0.1 | 0.1 |
| Total | 102.3 | 102.3 | 102.3 | 102.3 | 102.3 | 102.3 | 102.3 | 102.3 | 102.3 |
| Disclosure Designation | 1 | 9 | 3 | 7 | 2 | 8 | 11 | 18 | 13 |

TABLE 5A2

Formulation of Examples 24 to 27 and Comparative Examples C-4 to C-5

Parts by Weight in Examples of the Invention and Comparative Examples

| Component | 24 | 25 | 26 | 27 | C-4 | C-5 |
|---|---|---|---|---|---|---|
| 1H | 30 | 60 | 40 | 20 | 60 | 20 |
| 2H1 | 60 | 20 | 40 | 60 | 20 | 60 |
| HDPE KS 10100 | 10 | 20 | 20 | 20 | | |
| APRYL GN3-3021 | | | | | 20 | 20 |
| SFR-100 Silicon | 1 | 1 | 1 | 1 | 1 | 1 |
| Mg-Stearate | 0.7 | 0.7 | 0.7 | 0.7 | 0.7 | 0.7 |
| HOSTAST AT FE-2 | 0.5 | 0.5 | 0.5 | 0.5 | 0.5 | 0.5 |
| Irganox 1010 | 0.1 | 0.1 | 0.1 | 0.1 | 0.1 | 0.1 |
| Total | 102.3 | 102.3 | 102.3 | 102.3 | 102.3 | 102.3 |
| Disclosure Designation | 19 | 16 | 22 | 15 | 5 | 4 |

Examples 15–27 show formulations over a wide range of polymer quantities and ratios. Table 5B shows that all the Examples of the invention, through the balance value calculation, reconciled the inconsistent properties substantially better than Comparative Examples C-4 and C-5.

Although the invention has been described in considerable detail through the preceding specific embodiments, it is to be understood that these embodiments are for purposes of illustration only. Many variations and modifications can be made by one skilled in the art without departing from the spirit and scope of the invention.

What is claimed is:

1. A sheet material suitable for use as a floor, wall or ceiling covering material comprising
   (1) a polymer mixture having:
   (A) at least one homogeneously branched ethylene Polymer (A) having a molecular weight distribution, $M_w/M_n$, less than about 3 and a short chain branching distribution index SCBDI equal to or greater than about 50 percent obtainable by polymerization of ethylene with at least one $C_3$–$C_{20}$ α-olefin in the presence of a single site or constrained geometry catalyst;
   (B) at least one ethylene Polymer (B) having a density at least 0.005 g/cm³ greater than the density of ethylene Polymer (A) and a TREF elution temperature at least 5° C. greater than the TREF elution temperature of ethylene Polymer (A) and, optionally,
   (C) at least one ethylene Polymer (C) having a density at least 0.005 g/cm³ greater than the density of ethylene Polymer (B) and a TREF elution temperature at least 5° C. greater than the TREF elution temperature of ethylene Polymer (B), and
   (2) optionally a filler at least partially dispersed with a compatibilizer in the polymer mixture,
and when less than 10 wt % filler is dispersed in the polymer mixture, then the melt index of Polymer (A) is less than or equal to about 1.5 g/10 min., the melt index ratio of Polymer (B) to Polymer (A) is less than or equal to about 5.0, and/or Polymer (B) is a homogeneously branched ethylene polymer.

2. The sheet material of claim 1 wherein the TREF elution temperature of ethylene Polymer (B) exceeds the TREF elution temperature of ethylene Polymer (A) by at least 10° C.

3. The sheet material of claim 1 wherein the polymer mixture has a molecular weight distribution, $M_w/M_n$, less than or equal to about 3.

4. The sheet material of claim 1 wherein the polymer mixture has a melt flow index, $I_{10}/I_2$, less than or equal to about 10.

5. The sheet material of claim 1 wherein the ratio of the melt index, $I_2$, of ethylene Polymer (B) to the melt index, $I_2$, of ethylene Polymer (A) is in the range from about 1.5 to about 5.0.

6. The sheet material of claim 1 wherein ethylene Polymer (A) is a substantially linear ethylene polymer.

7. The sheet material of claim 1 wherein ethylene Polymer (B) is a homogeneously branched ethylene polymer having a molecular weight distribution, $M_w/M_n$, less than about 3 and an SCBDI greater than or equal to about 50 percent obtainable by polymerization of ethylene with at least one $C_3$–$C_{20}$ α-olefin in the presence of a single site or constrained geometry catalyst.

8. The sheet material of claim 7 wherein Polymer (B) is a substantially linear ethylene polymer characterized by: 0.01 to 3 long chain branches/1000 carbons.

9. The sheet material of claim 1 wherein the polymer mixture comprises less than 20 wt % polypropylene.

10. The sheet material of claim 1 wherein the polymer mixture comprises at least 75 wt % ethylene polymers.

11. The sheet material of claim 1 in which the polymer mixture complies with the equation:

$$\frac{(\% \text{ recovery@ 150 min.}) \times (\% \text{ strain @ break}) \times (MPa \text{ stress@ at break})}{(\text{flexural modulus in } MPa) \times (\text{Shore } D \text{ hardness})} \geq 500.$$

12. The sheet material of claim 11 wherein % recovery @150 min. $\geq 95$.

13. The sheet material of claim 12 wherein % strain @ break @ 90° C. $\geq 150$.

14. The sheet material of claim 1 in which the polymer mixture complies with the equation:

(ISO 4586-2 Scratch Depth in $\mu$m @ 5 N)×(Taber Abrasion in mg/100 revs)×(DIN Abrasion in mm$^3$)×(ASTM D-1894 Coefficient of Friction)≦200.

15. The sheet material of claim 14 wherein the coefficient of friction is less than or equal to 0.50.

16. The sheet material of claim 15 wherein the flexural modulus is less than or equal to 90.

17. The sheet material of claim 16 wherein the ISO 4586-2 scratch depth is less than or equal to 60 $\mu$m @ 5 N.

18. The sheet material of claim 1 which contains at least 75 weight percent Polymers (A), (B) and, optionally, (C); up to 60 weight percent filler; and an antistatic agent, and has a coefficient of friction less than or equal to 0.40 and a thickness in the range from 0.060 mm to 1 mm.

19. The sheet material of claim 1 having a foam structure.

20. The sheet material of claim 1 having a design imprinted on the surface of the sheet.

21. A floor, wall or ceiling covering comprising at least one layer of a sheet material according to claim 1.

22. The floor, wall or ceiling covering according to claim 21 which has a plurality of layers comprising a backcoat layer and a topcoat layer.

23. The floor, wall or ceiling covering according to claim 22, wherein the topcoat layer comprises the polymer mixture.

24. The floor, wall or ceiling covering of claim 23 wherein the topcoat layer complies with the following equation:

$$\frac{\text{(Ultimate Tensile Strength)} \times \text{(Ultimate Elongation)}}{\text{(Shore } D \text{ Hardness)} \times (DIN \text{ Abrasion})} \geq 20.$$

25. A process for the production of a sheet material suitable for use as a floor, wall or ceiling covering which comprises:
   (1) providing ethylene Polymers (A), (B), and optionally (C) in accordance with claim 1;
   (2) mixing the ethylene polymers of step (1) at an elevated temperature sufficient for melting those polymers, but below a temperature which causes substantial degradation of those polymers, to form a fluid mixture;
   (3) forming the fluid mixture of step (2) into a sheet; and
   (4) allowing the sheet of step (3) to cool and solidify.

26. The process according to claim 25 wherein the fluid mixture of step (2) provided by producing a blend of the ethylene Polymers (A), (B), and optionally (C) using a dual reactor system.

27. The process according to claim 25 wherein the fluid mixture of step (2) is (a) cooled, (b) pelletized and (c) fed into a heated mixer or extruder prior to step (3).

28. The process of claim 25 wherein step (3) comprises spread coating.

29. The process of claim 25, wherein step (3) comprises foaming the fluid mixture.

30. A process for producing a floor, wall or ceiling covering comprising applying the fluid mixture in accordance with claim 25 to a backcoat layer.

31. A process for producing a floor, wall or ceiling covering comprising applying the fluid mixture in accordance with claim 25 to a structural layer having a backcoat layer.

32. An intermediate for making a sheet material suitable for use as a floor, wall or ceiling covering material according to claim 25 comprising a pelletized polymer mixture having:
   (A) at least one homogeneously branched ethylene Polymer (A) having a molecular weight distribution, $M_w/M_n$, less than about 3 and an SCBDI equal to or greater than about 50 percent obtainable by polymerization of ethylene with at least one $C_3$–$C_{20}$ $\alpha$-olefin in the presence of a single site or constrained geometry catalyst;
   (B) at least one ethylene Polymer (B) having a density at least 0.005 g/cm$^3$ greater than the density of ethylene Polymer (A) and a TREF elution temperature at least 5° C. greater than the TREF elution temperature of ethylene Polymer (A) and, optionally,
   (C) at least one ethylene Polymer (C) having a density at least 0.005 g/cm$^3$ greater than the density of ethylene Polymer (B) and a TREF elution temperature at least 5° C. greater than the TREF elution temperature of ethylene Polymer (B), wherein the weight ratio of ethylene Polymer (B) to the total amount of ethylene Polymers (A) and (C) in the polymer mixture is at least 0.5, the weight ratio of any ethylene Polymer (C) to ethylene Polymer (A) does not exceed 2.0, and the total amount of ethylene Polymer (A) and any ethylene Polymer (C) in the polymer mixture is at least 25 wt % based on the total amount of polymers in the polymer mixture.

* * * * *